(12) United States Patent
Khan et al.

(10) Patent No.: US 11,003,008 B2
(45) Date of Patent: *May 11, 2021

(54) HETEROCYCLIC LIQUID CRYSTAL COMPOSITION, REVERSE-MODE POLYMER DISPERSED LIQUID CRYSTAL ELEMENT, AND ASSOCIATED SELECTIVELY DIMMABLE DEVICE

(71) Applicant: NITTO DENKO CORPORATION, Osaka (JP)

(72) Inventors: Sazzadur Rahman Khan, San Diego, CA (US); Hiep Luu, San Marcos, CA (US)

(73) Assignee: NITTO DENKO CORPORATION, Osaka (JP)

(*) Notice: Subject to any disclaimer, the term of this patent is extended or adjusted under 35 U.S.C. 154(b) by 96 days.

This patent is subject to a terminal disclaimer.

(21) Appl. No.: 16/323,239

(22) PCT Filed: Aug. 4, 2017

(86) PCT No.: PCT/US2017/045523
§ 371 (c)(1),
(2) Date: Feb. 4, 2019

(87) PCT Pub. No.: WO2018/031410
PCT Pub. Date: Feb. 15, 2018

(65) Prior Publication Data
US 2019/0187497 A1    Jun. 20, 2019

Related U.S. Application Data

(60) Provisional application No. 62/371,148, filed on Aug. 4, 2016.

(51) Int. Cl.
C09K 19/34     (2006.01)
G02F 1/1334    (2006.01)
(Continued)

(52) U.S. Cl.
CPC ........ *G02F 1/1334* (2013.01); *C09K 19/3477* (2013.01); *G02F 1/137* (2013.01);
(Continued)

(58) Field of Classification Search
CPC ..................................................... C09K 19/44
See application file for complete search history.

(56) References Cited

U.S. PATENT DOCUMENTS 5,385,692 A    1/1995  Iwaki et al.
6,623,810 B2   9/2003  Sekine et al.
(Continued)

FOREIGN PATENT DOCUMENTS

CN    1974616 A      6/2007
CN    104087307 B    4/2016
(Continued)

OTHER PUBLICATIONS

Yoon, H. et al., Homogeneous and homeotropic alignment of bent-core uniaxial and biaxial nematic liquid crystals, Soft Matter, 7(19), 8770-5, 2011.
(Continued)

*Primary Examiner* — Chanceity N Robinson
(74) *Attorney, Agent, or Firm* — Maschoff Brennan; Brent A. Johnson; David W. Old

(57) ABSTRACT

Heterocyclic liquid crystal compositions that can allow for the adjustment of their refractive indices by the application
(Continued)

Positive Dielectric Anisotropy    Negative Dielectric Anisotropy of an electric field, such as those described by the following formula:

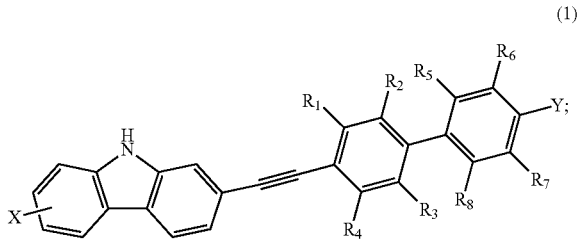

(1)

are disclosed. Also disclosed are selectively dimmable reverse-mode polymer dispersed liquid crystal (PDLC) elements and devices using the aforementioned compositions, which are transparent when no voltage is applied and opaque when a voltage is applied.

14 Claims, 2 Drawing Sheets

(51) Int. Cl.
  G02F 1/1333    (2006.01)
  G02F 1/1337    (2006.01)
  G02F 1/137     (2006.01)
  C09K 19/44     (2006.01)
  C09K 19/12     (2006.01)
  C09K 19/20     (2006.01)
(52) U.S. Cl.
  CPC .. G02F 1/133305 (2013.01); G02F 1/133723 (2013.01); C09K 19/44 (2013.01); C09K 2019/122 (2013.01); C09K 2019/123 (2013.01); C09K 2019/2035 (2013.01); G02F 2001/13347 (2013.01); G02F 2001/13706 (2013.01); G02F 2001/13712 (2013.01); G02F 2001/133738 (2013.01)

(56) References Cited

U.S. PATENT DOCUMENTS

| | | | |
|---|---|---|---|
| 8,323,805 | B2 | 12/2012 | Zheng et al. |
| 8,405,799 | B2 | 3/2013 | Fujisawa et al. |
| 8,420,235 | B2 | 4/2013 | Zheng |
| 8,747,695 | B2 | 6/2014 | Jasper et al. |
| 8,999,198 | B2 | 4/2015 | Reiffenrath et al. |
| 9,169,438 | B2 | 10/2015 | Reiffenrath et al. |
| 9,296,948 | B2 | 3/2016 | Manabe et al. |
| 2002/0001734 | A1 | 1/2002 | Yoshikawa et al. |
| 2003/0003246 | A1 | 1/2003 | Negoro et al. |
| 2004/0115367 | A1 | 6/2004 | Iftime et al. |
| 2008/0063808 | A1 | 3/2008 | Stumpe et al. |
| 2009/0290214 | A1 | 11/2009 | Cho et al. |
| 2010/0181533 | A1 | 7/2010 | Jansen et al. |
| 2012/0287354 | A1 | 11/2012 | Heckmeier et al. |
| 2013/0128339 | A1 | 5/2013 | Gu et al. |
| 2013/0207038 | A1 | 8/2013 | Haensel et al. |
| 2014/0008575 | A1 | 1/2014 | Jasper et al. |
| 2014/0239227 | A1 | 8/2014 | Manabe et al. |
| 2014/0346399 | A1 | 11/2014 | Fujita et al. |
| 2015/0299577 | A1 | 10/2015 | Junge et al. |

FOREIGN PATENT DOCUMENTS

| | | | | |
|---|---|---|---|---|
| DE | 4344422 | A1 | 6/1995 | |
| EP | 0442266 | B1 | 12/1994 | |
| EP | 1939268 | A1 * | 7/2008 | ............. C09K 19/46 |
| EP | 1939268 | B1 | 11/2012 | |
| JP | 07-292393 | A | 11/1995 | |
| JP | 2005-298453 | | 10/2005 | |
| WO | 2015022980 | A1 | 2/2015 | |

OTHER PUBLICATIONS

Malthete, J. et al., Recherches sur les Substances Mésomorphes III. Tolanes Nématiques, Molecular Crystals and Liquid Crystals, 23(3-4), 233-60, Jan. 1973.
Hird, M., Fluorinated liquid crystals—properties and applications. Chemical Society Reviews, 36(12), 2070-95, 2007.
Mouquinho, A.I. et al., New Polymer Networks for PDLC Films Application. In New Polymers for Special Applications, 2012. InTech.
Jeong, S.Y., Liquid crystalline behavior of mesogens formed by anomalous hydrogen bonding (Doctoral dissertation, Kent State University), Aug. 2011.
Tanner, J.R., Novel alignment materials for use in liquid crystal displays (Doctoral dissertation, University of North Carolina at Chapel Hill), 2006.
Rudolph, S.E. et al., Technologies for Smart Windows, ASHRAE Journal, 51(7), 104-7, Jul. 2009.
Cupelli, D. et al., Reverse Mode Operation Polymer Dispersed Liquid Crystal with a Positive Dielectric Anisotropy Liquid Crystal, Journal of Polymer Science Part B: Polymer Physics, 49, 257-262, 2011.
Sbar, N.L. et al., Electrochromic dynamic windows for office buildings, International Journal of Sustainable Built Environment, 1, 125-139, 2012.
Macchione, M. et al., Photochromic Reverse mode polymer dispersed liquid crystals, Liquid Crystals, 32(3), 315-318, Mar. 2005.
Di Profio, G. et al., Reverse-Mode Operation Switchable Nematic Emulsions, Langmuir, 18(8), 3034-3038, Apr. 2002.
Yamaguchi, R. et al., Electro-optical Properties and Morphology of Reverse Scattering Mode TN LCD, Journal of Photopolymer Science and Technology, 25(3), 313-316, Jun. 2012.
Ahmad, F. et al., Current Trends in Studies on Reverse-Mode Polymer Dispersed Liquid-Crystal Films—A Review, Electronic Materials Letters, 10(4), 679-92, Jul. 2014.
Li, N. et al., Synthesis of 1, 4-Bis(phenylethynyl)benzenes and Their Application as Blue Phase Liquid Crystal Composition, International Journal of Molecular Sciences, 14(12), 23257-73, Nov. 2013.
Abidin, I.S.B.Z., Study on High-Performance PDLC Optical Devices (Master Thesis, Gunma University), 2013.
International Search Report and Written Opinion for PCT/US2017/045523, dated Feb. 19, 2018.
Nolan, et al., Reverse mode polymer dispersed liquid crystal display incorporating a dual frequency addressable liquid crystal mixture, Molecular Crystals and Liquid Crystals Letters, 8(4), 75-83, Jan. 1991.
Gotoh, et al., Preparation and Optical Properties of a Reverse-Mode Polymer Dispersed Liquid Crystal Film, MRS Proceedings, 277, 217-222, 1992.
Chen, T.-J. et al., Electro-optical properties of reverse-mode films of planar aligned polymer-dispersed liquid crystal. Journal of Polymer Research, 13(2), 85-89, Apr. 2006.

\* cited by examiner

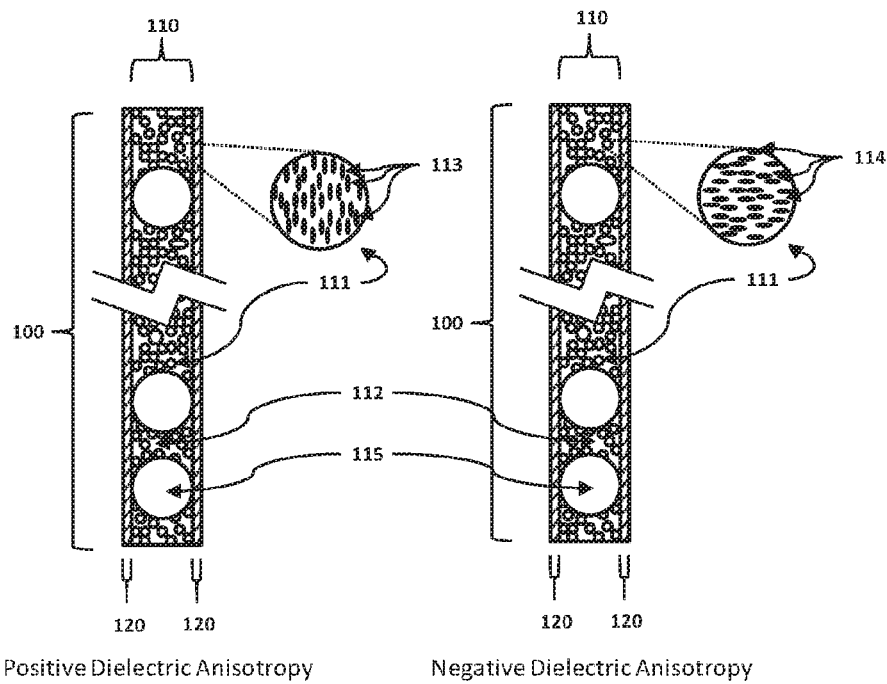
FIGs. 1A and 1B
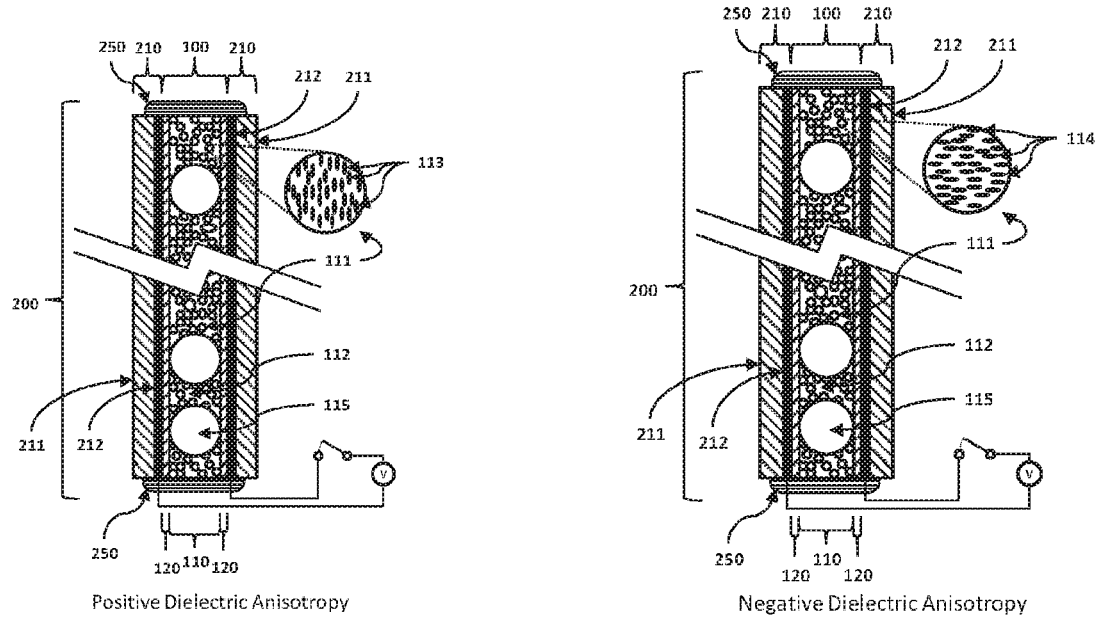
FIG. 2 — Positive Dielectric Anisotropy
FIG. 3 — Negative Dielectric Anisotropy

HETEROCYCLIC LIQUID CRYSTAL COMPOSITION, REVERSE-MODE POLYMER DISPERSED LIQUID CRYSTAL ELEMENT, AND ASSOCIATED SELECTIVELY DIMMABLE DEVICE

CROSS-REFERENCE TO RELATED APPLICATIONS

This application is a national phase application of PCT/US2017/045523, filed on Aug. 4, 2017, which claims the benefit of U.S. Provisional Application 62/371,148, filed Aug. 4, 2016, the entire disclosure of all of which are incorporated by reference.

FIELD

These embodiments relate to compounds or compositions having both liquid and crystalline properties. These embodiments also include elements or devices using the aforementioned compounds or compositions.

BACKGROUND

In the field of windows, smart windows are attractive alternatives to conventional mechanical shutters, blinds, or hydraulic methods of shading. Currently, there are three main technologies for smart window applications: suspended particle displays (SPD), Polymer Dispersed Liquid Crystals (PDLCs), and metal oxide electrochromics (ECs). S. Rudolph, J. Dieckmann, & J. Brodrick, *Technologies for Smart Windows*, ASHRAE Journal 104 (July 2009); D. Cupelli et al., *Reverse Mode Operation Polymer Disperse Liquid Crystal with a Positive Dielectric Anisotropy Liquid Crystal*, 49 J. Polymer Sci. Part B: Polymer Physics 257-62 (2011).

One drawback of conventional PDLCs or conventional mode devices is that the window becomes transparent only when a voltage is applied, thus it fails passively opaque, Windows that fail opaque are not desirable in applications where visibility through the window would enhance safety when there is loss of power in an emergency situation such as in vehicle or aircraft crash or in a building fire. For electrochromic windows, the application of a voltage is usually needed to trigger a change in the window characteristics, even though one may not be required to maintain dimming. N. Sbar et al., *Electrochromic Dynamic Windows for Office Buildings*, 1 Intl. J. of Sustainable Built Environment 125-39 (2012), As a result of the desire to have windows fail transparently, advances have been made to create reverse mode devices such as Reverse Mode PDLCs, or PDLCs that are transparent when off. Cupelli, supra; M. Macchionea et al., *Photochromic Reverse Mode Polymer Dispersed Liquid Crystals,* 32(3) Liquid Crystals 315-9 (2005).

One way of creating reverse mode PDLCs has been found to be by using liquid crystal nematic compounds, either negative dielectric anisotropy or positive dielectric anisotropy, and aligning them such that they are transparent in the off state. G. Di Profio et al., *Reverse-Mode Operation Switchable Nematic Emulsions*, 18(8) Langmuir 3034-8 (2002); R. Yamaguchi et al., *Electro-optical Properties and Morphology of Reverse Scattering Mode TN LCD*, 25(3) J. Photopolymer Sci. and Tech. 313-6 (2012); T. Chen at al., *Electro-Optical Properties of Reverse-Mode Films of Planar Aligned Polymer-Dispersed Liquid Crystal*, 13(2) J. Polymer Research 85-9 (April 2006).

To meet demands for low driving voltage, there is a need for new liquid crystal materials to enable enhanced operation of reverse mode smart windows with low driving voltages.

SUMMARY

As a result of the need for new reverse-mode PDLC materials, new materials have been successfully synthesized. The material can be used in reverse mode PDLC dimmable devices. The materials can be integral to a window or applied as a coating to provide a dimming capability for privacy purposes among others.

In some embodiments, a liquid crystal composition can be described. In some embodiments, the liquid crystalline composition can comprise a compound of Formula 1:

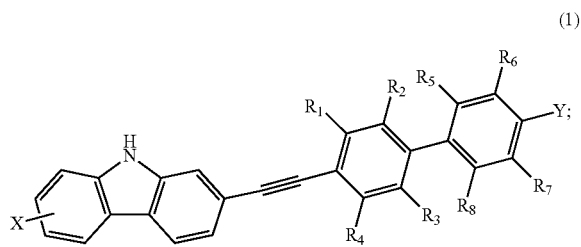

(1)

wherein the carbazolyl can be unsubstituted or substituted with one, two, or more of: a $C_{1-6}$ alkyl, a $C_{1-6}$ alkyloxy, —F, —$CF_3$, or —$OCF_3$; $R_1$, $R_2$, $R_3$, $R_4$, $R_5$, $R_6$, $R_7$, and $R_8$ can be independently: —H, a $C_{1-6}$ alkyl, a $C_{1-6}$ alkyloxy, —F, —$CF_3$, or —$OCF_3$; X can be a $C_{2-12}$ alkyl or a $C_{2-12}$ alkyloxy, where any non-consecutive $CH_2$ can be optionally substituted with —O—, —B—, or —S—; and Y can be a: —F, —CN, —$CF_3$, —$OCF_2$, —$OFC_3$, or —NCS. In some embodiments, X can be selected from:

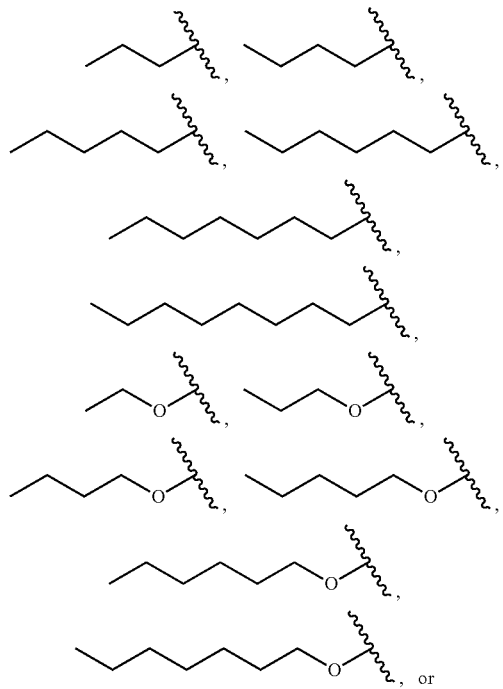

-continued
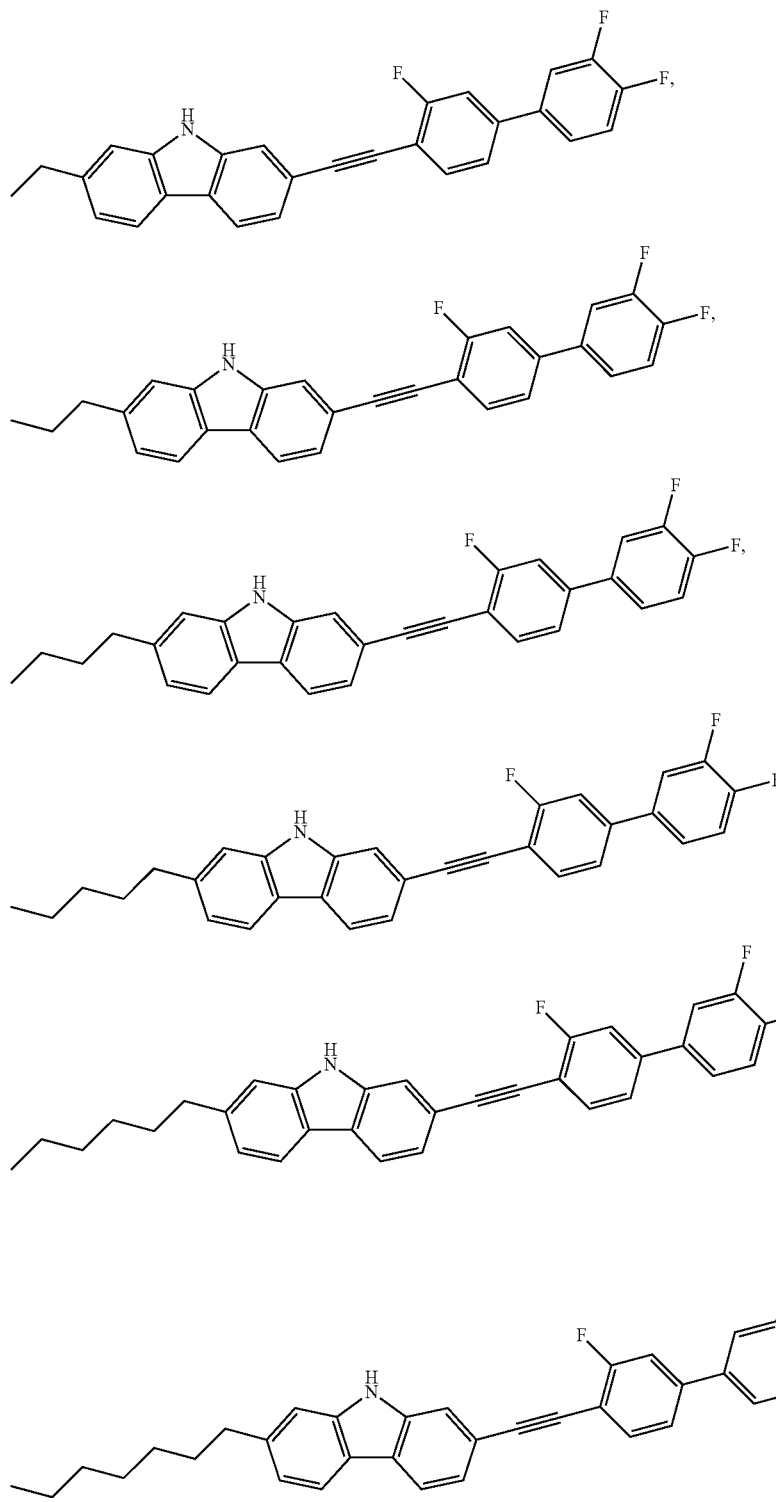
In some embodiments, the composition can comprise a compound represented by:

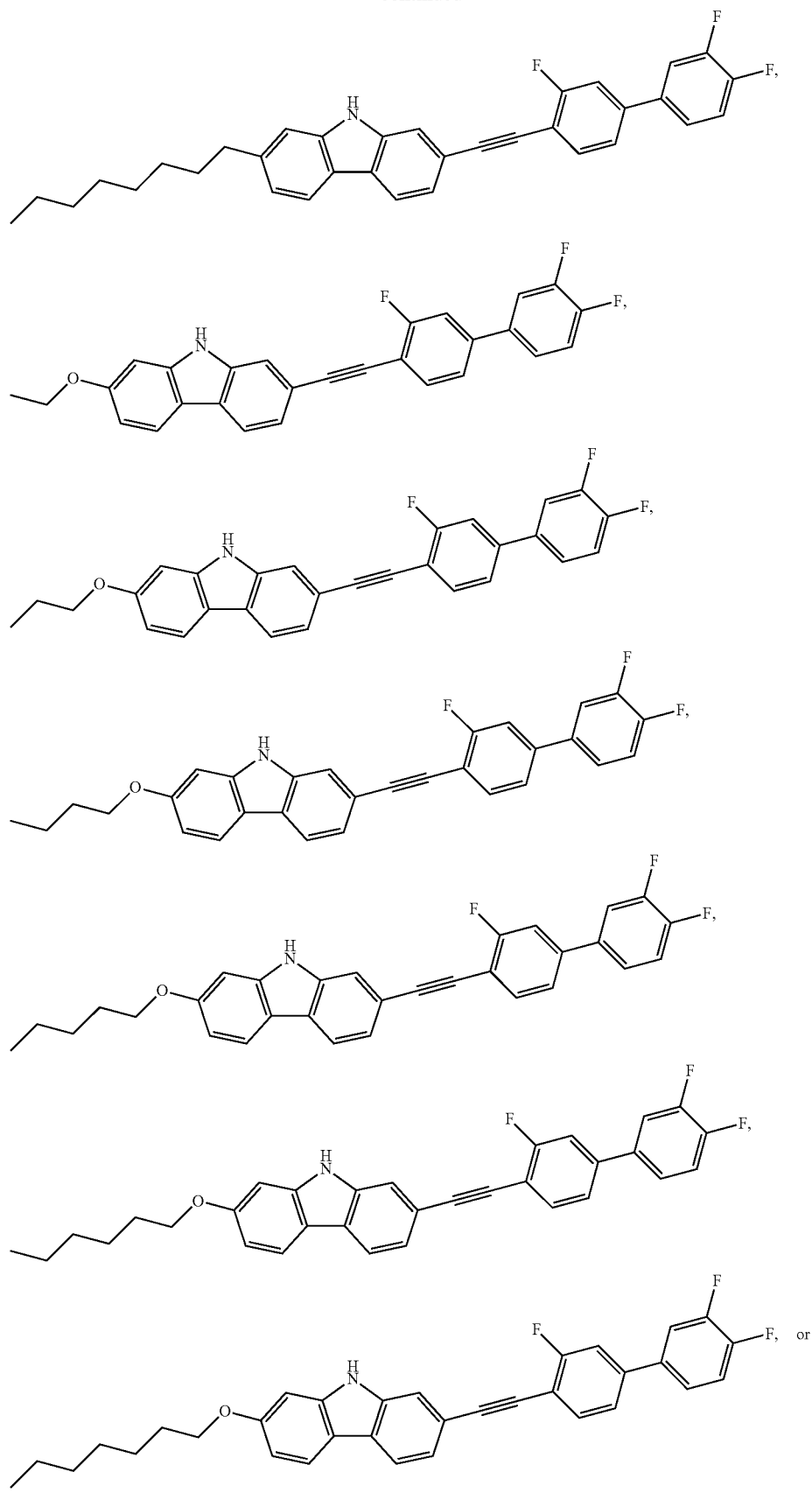

-continued

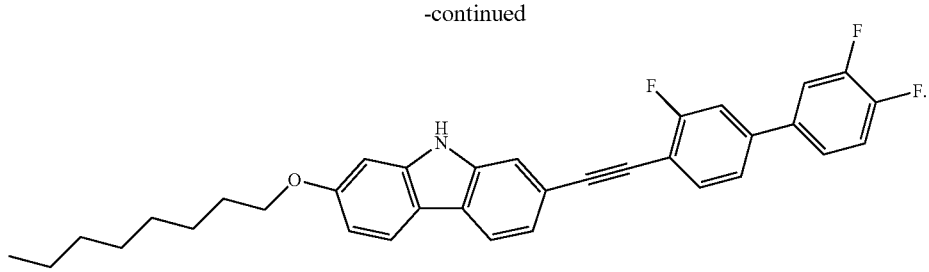

In some embodiments, the liquid crystal composition can further comprise a second compound of Formula 2:

(2)

wherein $X^1$ is substituted phenyl, substituted biphenyl, substituted benzoate, or substituted phenyl acetate; and $Y^1$ is $C_{1-8}$ alkyl, $C_{1-8}$ alkyloxy, —CN, —NCS, F, Cl, OH, $NO_2$, —$NR^aR^b$, —$NHCOR^a$, —$NHSO_2R^a$, —$OCOR^a$, or —$SO_2R^a$; —$C(O)R^a$, —$C(O)OR^a$, —$C(O)NHR^a$, or —$C(O)NR^aR^b$, and $R^a$ and $R^b$ can be independently H or optionally substituted $C_{1-6}$ hydrocarbyl.

In some compositions, $X^1$ can be:

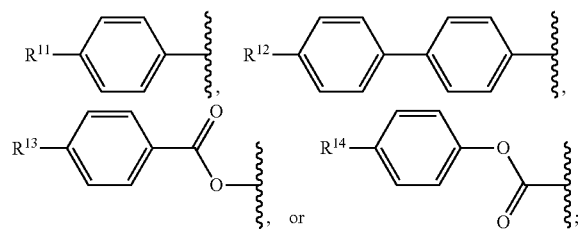

wherein $R^{11}$, $R^{12}$, $R^{13}$ and $R^{14}$ are independently alkyl or alkoxy. In some embodiments, $R^{11}$, $R^{12}$, $R^{13}$ and $R^{14}$ can be independently $C_{3-9}$ alkyl or $C_{3-9}$ alkoxy. For some compositions, $Y^1$ can be $C_{1-8}$ alkyl, or CN.

For some compositions, the second compound can be:

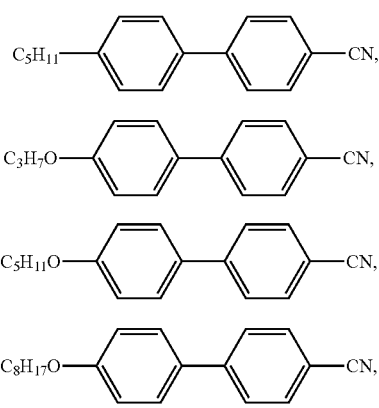

-continued

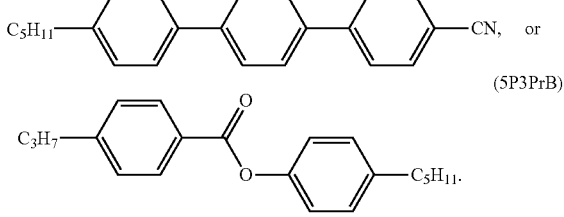

In some embodiments, a liquid crystal element can be described. In some embodiments, the liquid crystal element can comprise: (1) a transparency changing layer defining two opposing surfaces, the layer comprising the aforedescribed composition; and (2) at least two alignment layers, where the transparency changing layer can be bounded on both opposing surfaces by the first and second alignment layers respectively.

In some embodiments, a selectively dimmable device can be described. In some embodiments, the device can comprise: at least two conductive substrates, the first and second conductive substrates defining a gap there between, the aforedescribed element disposed between the first and second conductive substrates within the gap, and a voltage source, where the first and second conductive substrates, the element, and the voltage source are all in electrical communication such that when a voltage is applied from the voltage source an electric field is applied across the element.

In some embodiments, the selectively dimmable device can be characterized as having a haze of at most 5% when there is no voltage applied but a haze of at least 40% when a voltage of 25 volts or more is applied across the device. In some embodiments, the substrates are flexible so that the device can form a flexible sheet.

These and other embodiments are described in greater detail below.

BRIEF DESCRIPTION OF THE DRAWINGS

FIG. 1A is a depiction of a liquid crystal element with a liquid crystal with positive dielectric anisotropy.

FIG. 1B is a depiction of a liquid crystal element with a liquid crystal with negative dielectric anisotropy.

FIG. 2 is a depiction of an embodiment of a selectively dimmable device with a positive dielectric anisotropic polymer dispersed liquid crystal.

FIG. 3 is a depiction of an embodiment of a selectively dimmable device with a negative dielectric anisotropic polymer dispersed liquid crystal.

DETAILED DESCRIPTION

Figure 4:
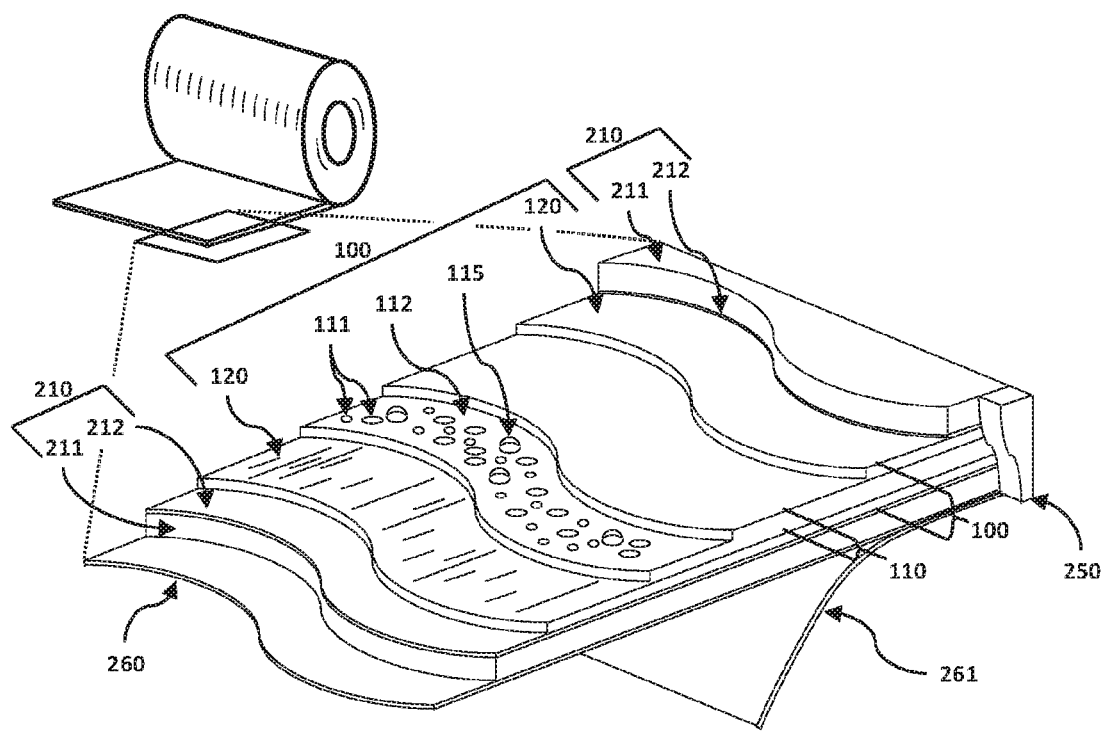
FIG. 4 is yet another embodiment of a selectively dimmable device where the device comprises of a flexible film. Such a film may be used alone or may be applied on existing windows.

As used herein, the term "$C_X$—$C_Y$" or "$C_{X-Y}$" refers to a carbon chain having from X to Y carbon atoms. For example, $C_{1-12}$ alkyl or $C_1$-$C_{12}$ alkyl includes fully saturated hydrocarbons containing 1, 2, 3, 4, 5, 6, 7, 8, 9, 10, 11, or 12 carbon atoms.

The term "alkyl" as used herein refers to a moiety comprising carbon and hydrogen containing no double or triple bonds. An alkyl may be linear, branched, cyclic, or a combination thereof, and contain from one to thirty-five carbon atoms. Examples of alkyl groups include but are not limited to methyl, ethyl, propyl, isopropyl, cyclopropyl, n-butyl, iso-butyl, tert-butyl, cyclobutyl, pentyl isomers, cyclopentane, hexyl isomer, cyclohexane, and the like. The term "linear alkyl" as used herein refers to —$(CH_2)_qCH_3$, where q varies between 0 to 30. The term "$C_{1-20}$ alkyl" as used herein refers to alkyl having from 1 to 20 carbon atoms such as but not limited to methyl, ethyl, propyl isomers, butyl isomers, cyclobutyl isomers, pentyl isomers, cyclopentyl isomers, hexyl isomers, cyclohexyl isomers, heptyl isomers, cycloheptyl isomers, octyl isomers, cyclooctyl isomers, nonyl isomers, cyclononyl isomers, decyl isomers, cyclodecyl isomers. undecyl isomers, cycloundecyl isomers, dodecyl isomers, cyclododecyl isomers, tridecyl isomers, cyclotridecyl isomers, tetradecyl isomers, cyclotetradecyl isomers, pentadecyl isomers, cyclopentadecyl isomers, hexadecyl isomers, cyclohexadecyl isomers, heptadecyl isomers, cycloheptadecyl isomers, octadecyl isomers, cyclooctadecyl isomers, nonadecyl isomers, cyclononadecyl isomers, eicosyl isomers, cycloeicosyl isomers. The term "alkylene" is a subgenus of "alkyl" and refers to a divalent alkyl moiety, e.g. —$CH_2$—, etc.

The term "alkyloxy" as used herein refers to a moiety comprising an alkyl that is singularly bonded to an oxygen, the oxygen becoming the point of attachment for the moiety (i.e. —O—R). An alkyloxy may be linear, branched, cyclic, or a combination thereof, and contain from one to thirty-five carbon atoms. When an alkyloxy is branched the alkyl group comprising the alkyloxy is a branched alkyl.

As used herein, the term "optionally substituted" is used to denote a group that may be substituted or unsubstituted. As used herein "unsubstituted" is used to denote a structure where the hydrogen atoms in the parent structure are present in the structure. As used herein "substituted" is used to denote a structure derived from the unsubstituted parent structure wherein one or more hydrogen atoms on the parent structure have been independently replaced by one or more substituent groups. A substituted group may have one or more substituent groups on the parent group structure.

The terms "positive dielectric anisotropy", "negative dielectric anisotropy", and "neutral dielectric anisotropy" as used herein all have meanings known by those of ordinary skill in the art. The dielectric anisotropy is related to dielectric properties as well as optical properties depending on the direction, either along the length of the molecule (or molecular axis), or perpendicular to the length of the molecule (or molecular axis). The dielectric properties depend on the molecular shape and substituent moieties and their locations on a given molecule.

A molecule is said to have a positive dielectric anisotropy if the dielectric constant parallel to the length of the molecule is greater than the dielectric constant perpendicular to the length of the molecule, where the length of a molecule is defined as vector between the two farthest moieties.

A molecule is said to have a negative dielectric anisotropy if the dielectric constant perpendicular to the length molecule is greater than the dielectric constant parallel to the length of the molecule, where the length of a molecule is defined as vector between the two farthest moieties.

A molecule is said to have a neutral dielectric anisotropy if the dielectric constant perpendicular to the length molecule is approximately the same as the dielectric constant parallel to the length of the molecule, where the length of a molecule is defined as vector between the two farthest moieties. Approximately the same is less than a 1% difference between dielectric constants.

The term "opposing surfaces" as used herein refers to a group of two surfaces or sides of a shape or polygon that are on the opposite side of the shape or polygon with respect to each other (e.g. the top and bottom of a layer, the front and back or a shape). When used in singular, the term "opposing surface" refers to one of the two surfaces.

The current disclosure describes a liquid crystal composition, a polymer dispersed liquid crystal (PDLC) element, and a selectively dimmable device based on the aforementioned element.

Liquid Crystal Composition

In some embodiments, a composition can be described as having both liquid and crystalline characteristics; a liquid crystal composition. In some embodiments, the liquid crystal composition can comprise one or more compounds. In some embodiments, the liquid crystal composition can exhibit a mesogenic liquid crystal phase. In some embodiments, the liquid crystal composition can comprise a compound with positive dielectric anisotropy. In some embodiments, the liquid crystal composition can comprise a compound with negative dielectric anisotropy. In some embodiments, the liquid crystal composition can comprise both a compound with positive dielectric anisotropy and a compound with negative dielectric anisotropy.

In some embodiments, the liquid crystal composition can comprise a heterocyclic compound. In some embodiments, the heterocyclic compound can comprise a compound represented by Formula 1:

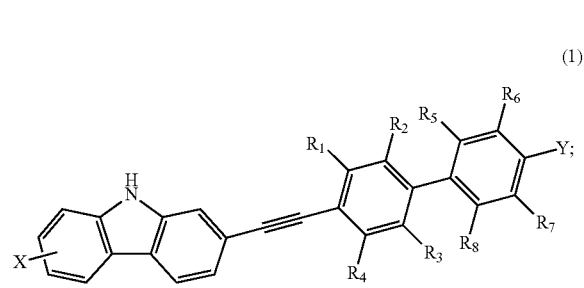

(1)

wherein the carbazolyl can be unsubstituted or substituted with one, two, or more of: a $C_{1-6}$ alkyl, a $C_{1-6}$ alkyloxy, —F, —$CF_3$, or —$OCF_3$; $R_1$ thru $R_3$ can be independently: —H, a $C_{1-6}$ alkyl, a $C_{1-6}$ alkyloxy, —F, —$CF_3$, or —$OCF_3$; X can be a $C_{2-12}$ alkyl or a $C_{2-12}$ alkyloxy, where any non-consecutive $CH_2$ can be optionally substituted with —O—, —B—, or —S—; and Y can be: —Br, —Cl, —F, —I, —CN, —$CF_3$, —NCS, or —$OCF_3$. In some embodiments, the carbazolyl can be an unsubstituted carbazolyl. In some embodiments, $R_1$ thru $R_3$ can be independently: —H, a $C_{1-6}$ alkyl, a $C_{1-6}$ alkyloxy, —F, —$CF_3$, or —$OCF_3$.

In some embodiments, $R_1$ thru $R_4$ can be independently: —H, or —F. In some embodiments, $R_2$ can be —F and $R_1$, $R_3$ and $R_4$ can be —H.

In some embodiments, X can be a $C_{2-12}$ alkyl, or a $C_{2-12}$ alkyloxy. In some embodiments, X can be a $C_{3-8}$ alkyl, or a $C_{3-8}$ alkyloxy. In some embodiments, X can be selected from:

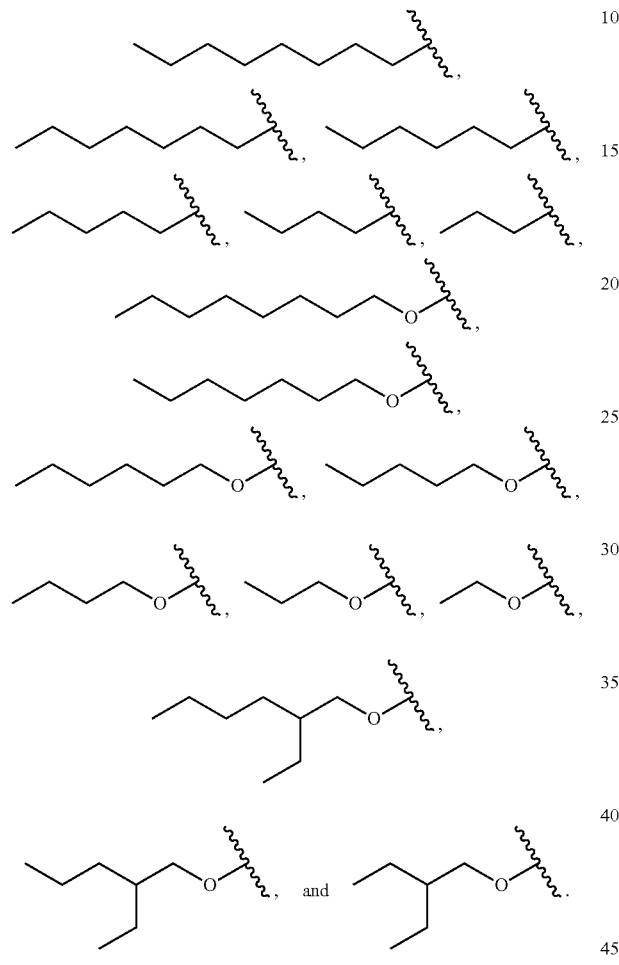

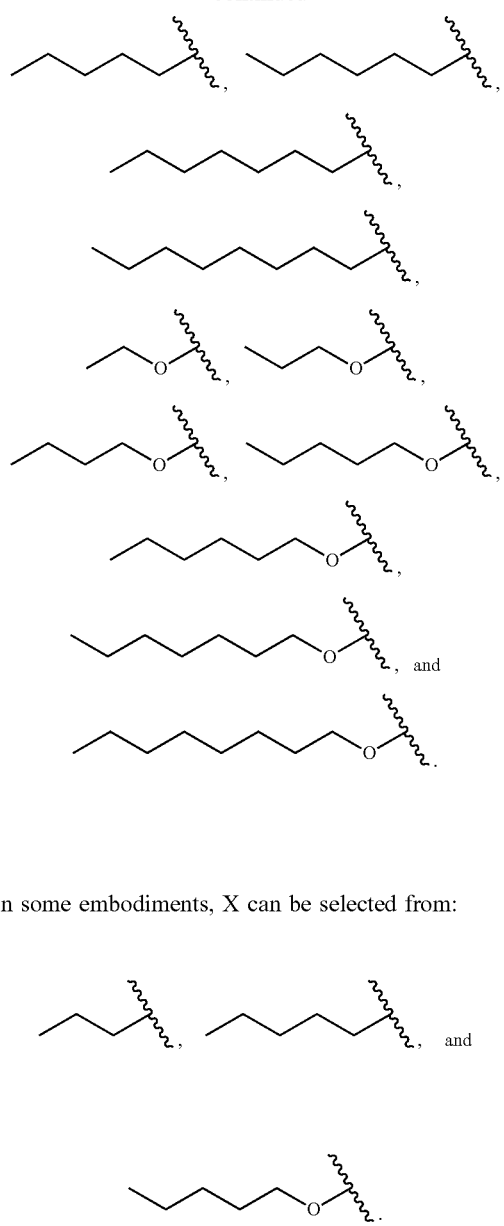

In some embodiments, X can be selected from:

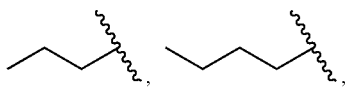

In some embodiments, Y can be: —F, —Br, —CN, or —NCS. In some embodiments, Y can be —CN.

In some embodiments, the liquid crystal composition can comprise a positive dielectric anisotropic composition. In some embodiments, the liquid crystal composition can comprise a compound represented by:

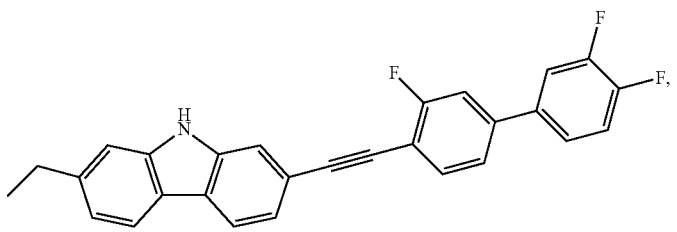

-continued
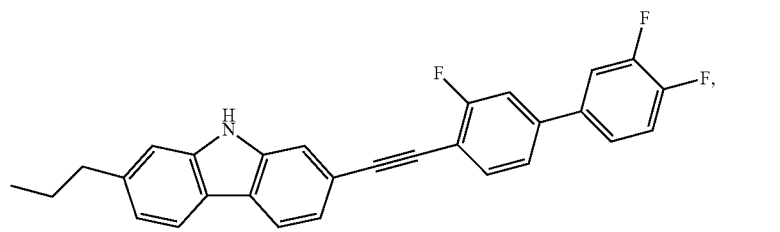
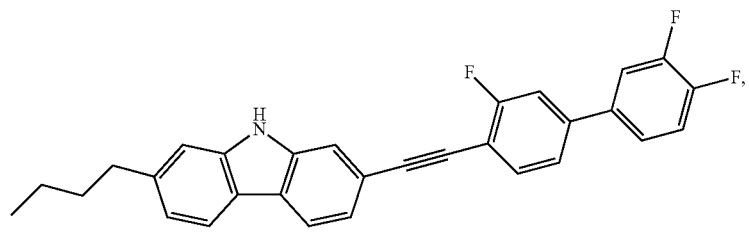
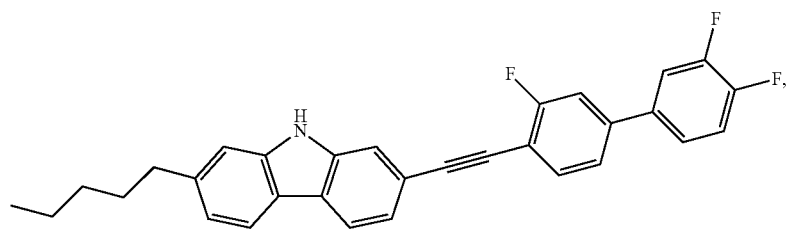
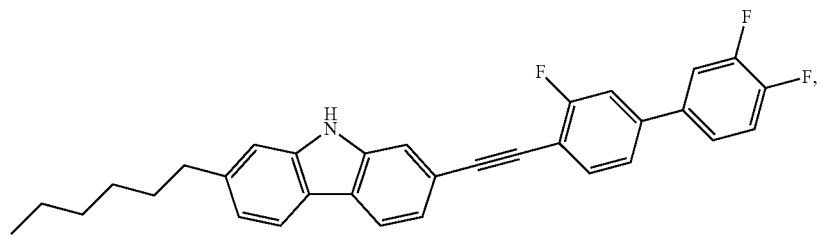
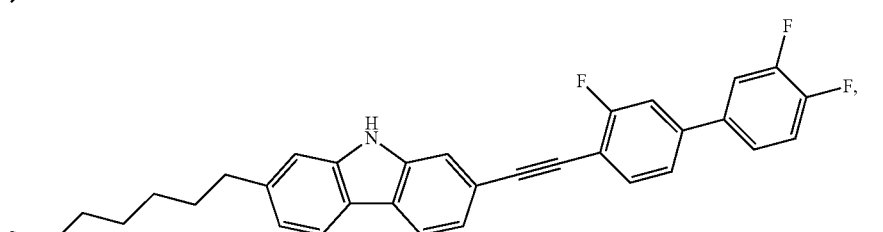
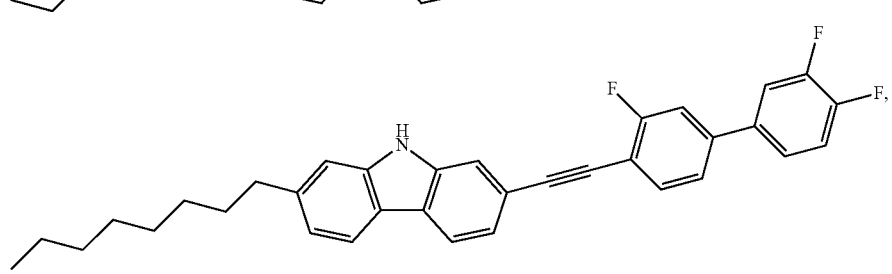
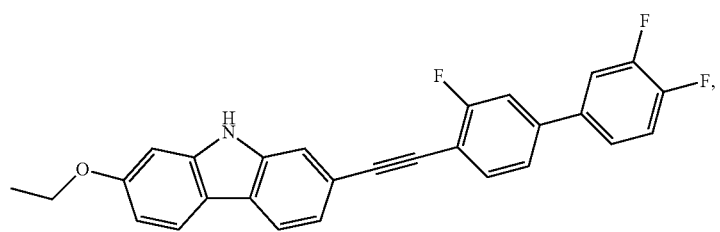

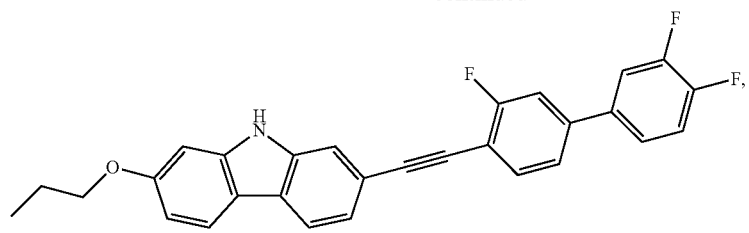
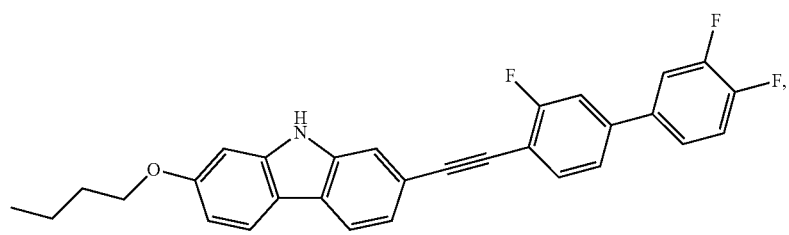
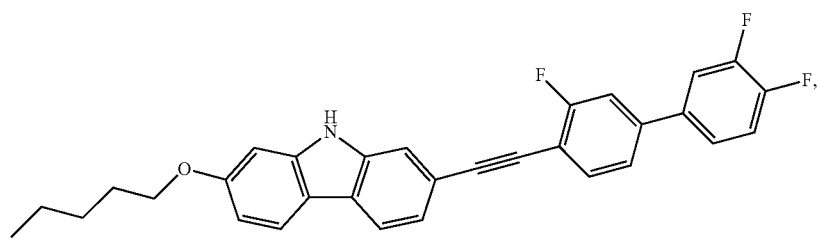
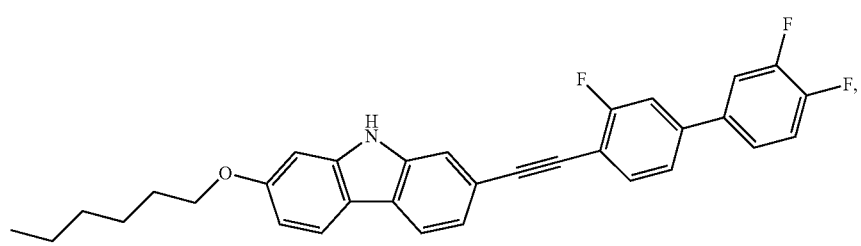
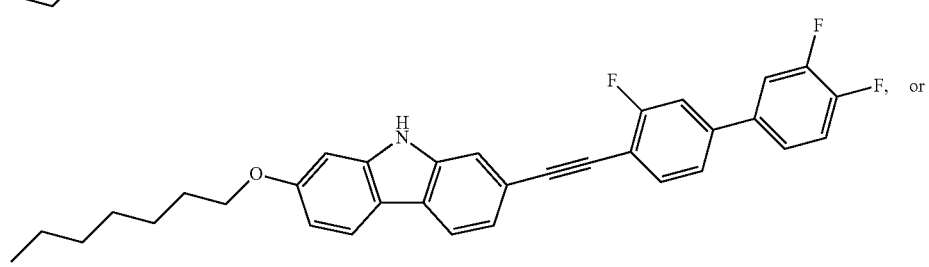
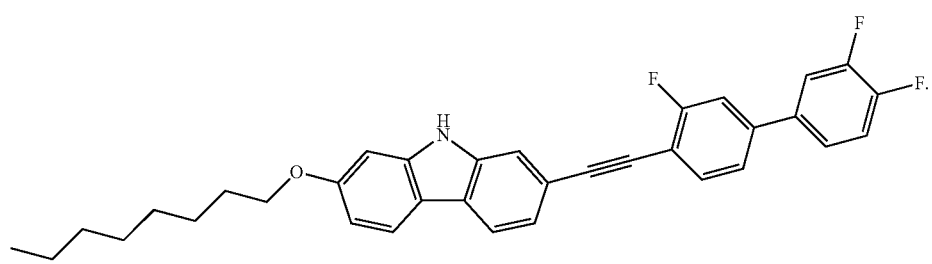

In some embodiments, the liquid crystal composition can comprise liquid crystal compounds that have a molecular aspect ratio of between about 2, about 3, about 3.5, to about 6, about 7, about 10, about 12, and any combination thereof, such as about 4.3, about 4.32, or about 5.49.

Liquid Crystal Mixture

Some embodiments include a nematic liquid crystalline mixture. In some embodiments, the liquid crystal composition can further comprise at least one additional liquid crystal compound. The mixture can comprise an additional compound with liquid crystal properties (such as a second compound, a third compound, a fourth compound, etc.) in addition to a compound of Formula 1. In some embodiments, the mixture compounds can be chosen from compounds described by Formula 2.

(2)

wherein $X^1$ is substituted phenyl, substituted biphenyl, substituted benzoate, or substituted phenyl acetate; and $Y^1$ is $C_{1-8}$ alkyl, $C_{1-8}$ alkyloxy, —CN, —NCS, F, Cl, OH, $NO_2$, —$NR^aR^b$, —$NHCOR^a$, —$NHSO_2R^a$, —$OCOR^a$, or —$SO_2R^a$; —$C(O)R^a$, —$C(O)OR^a$, —$C(O)NHR^a$, or —$C(O)NR^aR^b$, and $R^a$ and $R^b$ can be independently H or optionally substituted $C_{1-8}$ hydrocarbyl.

With respect to any relevant structural representation, such as Formula 2, $X^1$ can be a substituted phenyl, substituted biphenyl, substituted benzoate, or substituted phenyl acetate. In some embodiments, $X^1$ can be:

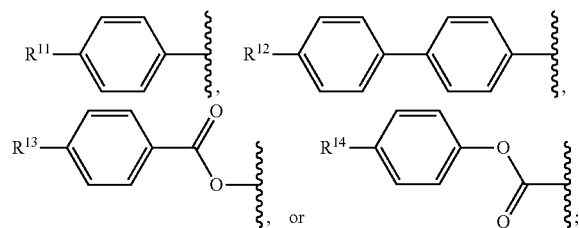

wherein $R^{11}$, $R^{12}$, $R^{13}$, and $R^{14}$ can be independently an alkyl, alkoxy or any substituent. In some embodiments, $R^{11}$, $R^{12}$, $R^{13}$ and $R^{14}$ can be independently a $C_{3-9}$ alkyl or $C_{3-9}$ alkoxy. In some embodiments, $R^{11}$, $R^{12}$, $R^{13}$ or $R^{14}$ can be $C_{3-9}$ alkyl, such as $C_5$ alkyl, $C_6$ alkyl, or $C_7$ alkyl. In some embodiments, $R^{11}$, $R^{12}$, $R^{13}$ or $R^{14}$ can be $C_{3-9}$ alkoxy, such as $C_8$ alkoxy.

With respect to any relevant structural representation, such as Formula 2, $Y^1$ can be $C_{1-8}$ alkyl, $C_{1-8}$ alkyloxy, —CN, —NCS, F, Cl, OH, $NO_2$, —$NR^aR^b$, —$NHCOR^a$, —$NHSO_2R^a$, —$OCOR^a$, or —$SO_2R^a$, —$C(O)R^a$, —$C(O)OR^a$, —$C(O)NHR^a$, or $C(O)NR^aR^b$. In some embodiments, $Y^1$ can be —CN or $C_{1-8}$ alkyl. In some embodiments, $Y^1$ can be —CN. In some embodiments, $Y^1$ can be $C_{1-8}$ alkyl.

In some embodiments, the mixture compounds of Formula 2 can be selected from the group consisting of:

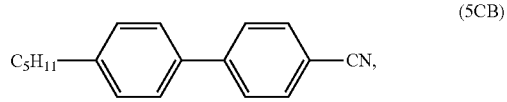

(5CB)

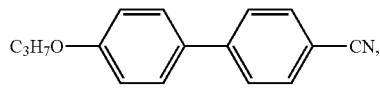

(3OCB)

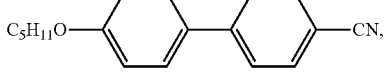

(5OCB)

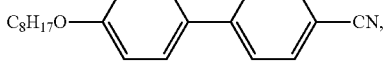

(8OCB)

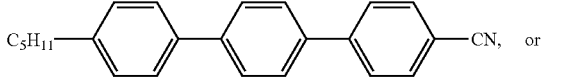

(5CT)

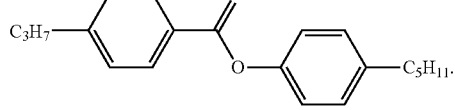

(5P3PrB)

In some embodiments, the weight percentages of the individual compounds in the mixture are chosen such that the total weight percentage of the liquid crystal mixture is equal to 100 wt %.

In some embodiments, the weight percentage of 5CB can be about 0-60 wt %, about 20-50 wt %, about 30-45 wt %, or any combination thereof, such as about 32 wt %, about 37 wt %, or about 45 wt %.

In some embodiments, the weight percentage of 3OCB can be about 0-25 wt %, about 5-20 wt %, about 10-17 wt %, or any combination thereof, such as about 12 wt %, about 13 wt %, or about 45 wt %.

In some embodiments, the weight percentage of 5OCB can be about 0-20 wt %, about 5-15 wt %, about 7-13 wt %, or any combination thereof, such as about 9 wt %, about 10 wt %, or about 12 wt %.

In some embodiments, the weight percentage of 8OCB can be about 0-25 wt %, about 5-20 wt %, about 10-17 wt %, or any combination thereof, such as about 12 wt % about 13 wt %, or about 16 wt %.

In some embodiments, the weight percentage of 5CT can be about 0-15 wt %, about 5-13 wt %, about 7-12 wt %, or any combination thereof, such as about 6 wt %, about 7 wt %, about 8 wt %, or about 11 wt %.

In some mixtures, the weight percentage of 5P3PrB can be about 0-40 wt %, or about 15-30 wt %, or any combination thereof, such as about 0 wt %, about 16 wt %, or about 28 wt %.

For some mixtures, the weight percentage of 5CB can be from about 33 wt % to about 46 wt %, such as about 32 wt %, about 37 wt %, or about 45 wt %; the weight percentage of 3OCB can be from about 11 wt % to about 17 wt %, such as about 12 wt %, about 13 wt %, or about 16 wt %; the weight percentage of 5OCB can be from about 8 wt % to about 13 wt %, such as about 9 wt %, about 10 wt %, or about 12 wt %; the weight percentage of 8OCB can be from about 10 wt % to about 17 wt %, such as about 12 wt %, about 13 wt %, or about 16 wt %; the weight percentage of 5CT can be from about 7 wt % to about 12 wt %, such as about 8 wt %, about 9 wt %, or about 11 wt %; and the weight percentage of 5P3PrB can be from 0 wt % to about 30 wt %, such as 0 wt %, about 15 wt %, or about 28 wt %;

where the weight percentage of the individual compounds in the mixture are chosen such that the total weight percentage of the liquid crystal mixture including the liquid crystal composition is 100 wt %.

In some embodiments, the liquid crystal mixture can further comprise a chiral dopant. In some embodiments, the chiral dopant can comprise a biphenyl branched, optionally substituted alkyl compound, such as 4'-(2-methylbutyl)-[1,1'-biphenyl]-4-carbonitrile (CB-15). In some embodiments, the chiral dopant can comprise a di-benzoate based compound, such as (S)-octan-2-yl 4-((4-(hexyloxy)benzoyl)oxy) benzoate (S-811 or ZLI-0811), R-octan-2-yl 4-((4-(hexyloxy)benzoyl)oxy)benzoate (R-811 or ZLI-3786), (S)-1-phenylethane-1,2-diyl bis(4-(4-pentylcyclohexyl)benzoate) (S-1011 or ZLI-4571), or (R)-1-phenylethane-1,2-diyl bis(4-(4-pentylcyclohexyl)benzoate) (R-1011 or ZLI-4572). In some embodiments, the chiral dopant can be (S)-octan-2-yl 4-((4-(hexyloxy)benzoyl)oxy)benzoate (S-811 or ZLI-0811) or R-octan-2-yl 4-((4-(hexyloxy)benzoyl)oxy)benzoate (R-811 or ZLI-3786). In some embodiments, the chiral dopant can comprise R-octan-2-yl 4-((4-(hexyloxy)benzoyl)oxy)benzoate (R-811 or ZLI-3786). In some embodiments, the chiral dopant can comprise 4'-(2-methylbutyl)-[1,1'-biphenyl]-4-carbonitrile (CB-15). In some embodiments, the mass percentage of chiral dopant to the composition can be from about 0-10 wt %, or about 0-5 wt %, about such as about 3 wt %.

Liquid Crystal Element

In some embodiments, as shown in FIG. 1A or FIG. 1B, a liquid crystal element, 100, can be described. In some embodiments, the liquid crystal element can comprise a transparency changing layer, 110, and at least two alignment layers, 120. In some embodiments, the transparency changing layer defines two opposing surfaces. In some embodiments, the transparency changing layer is bounded on both opposing surfaces by the first and second alignment layers respectively. In some embodiments, any of the above aforementioned layers can further comprise dispersants, plasticizers, binders, and/or solvents.

In some embodiments, the transparency changing layer, 110, can comprise any of the aforedescribed liquid crystal compositions, 111. In some embodiments, as shown in FIG. 1A, the composition can comprise a positive dielectric anisotropic compound, 113. Non-limiting examples of positive dielectric anisotropic compounds can be LC-1 thru LC-4 described in detail elsewhere in this document. In some embodiments, as shown in FIG. 1B, the composition can comprise a negative dielectric anisotropic compound, 114. In some embodiments, the composition can comprise a positive dielectric anisotropic compound and a negative dielectric anisotropic compound. In some embodiments, the transparency changing layer can further comprise a polymer, 112, where the composition is dispersed in the polymer. In some embodiments, as shown in FIG. 1, the composition is dispersed within the transparency changing layer such that the composition forms droplets, 111, suspended within the polymer matrix, 112. In some embodiments, the transparency changing layer can be described as a polymer dispersed liquid crystal (PDLC). In some embodiments, the transparency changing layer can further comprise spacers, 115.

In some embodiments, the liquid crystal element can be opaque to visible light but turn transparent upon the application of an electric field, or a normal mode PDLC. In some embodiments, the liquid crystal element can be transparent to visual light but opaque upon the application of an electric field, or a reverse mode element. In some embodiments, the liquid crystal element can be characterized as a reverse mode PDLC element.

In some embodiments, as shown in FIG. 1A or FIG. 1B, the transparency changing layer can comprise a liquid crystal composition, 111, and a polymer, 112, where the liquid crystal composition is dispersed in the polymer. In some embodiments, the polymer can be comprised of polymer precursors and initiators, which are then polymerized in situ. In some embodiments, the polymer precursors may comprise of monomers, oligomers, or any combination thereof, before polymerization. In some embodiments, the polymer can be a photopolymer. In some embodiments, the photopolymer can comprise polymer precursors and a photoinitiator. In some embodiments, the polymer can be a thermoplastic polymer. In some embodiments, the thermoplastic polymer can comprise polymer precursors and a thermal initiator. In some embodiments, the photopolymer can comprise a UV-curable polymer or a visual light based photopolymer. In some embodiments, the polymer can comprise a combination of a thermosplastic polymer and a photo/UV-curable polymer. In some embodiments, the ratio of liquid crystal compound to polymer can be between about 25:1 wt % to about 1:1 wt %. In some embodiments, the ratio of liquid crystal compound to polymer can be between about 15:1 wt % to about 3:1 wt %. In some embodiments, the ratio of liquid crystal compound to polymer can be between about 10:1 wt % to about 8:1 wt %; or about 9:1 wt %.

In some embodiments, the monomers can comprise of styrene, vinyl ethers, N-vinyl carbazoles, lactones, lactams, cyclic ethers, cyclic acetals, cyclic siloxanes, or combinations thereof. In some embodiments, the oligomer can comprise of acrylates and/or methacrylates. In some embodiments, the oligomer can comprise of diethylene glycol diacrylate, diethylene glycol dimethacrylate, triethylene glycol diacrylate, diethylene glycol dimethacrylate, triethylene glycol diacrylate, triethylene glycol dimethacrylate, trimethylol propane, diallyl ether, trimethylolpropane triacrylate, pentaerythritol triacrylate, pentaerithritol tetracrylate, pentaerythol pentacrylate, dipentaerythrytol hydroxy pentacrylate, methyl methacrylate, acrylonitrile, ethyl acrylate, 2-chloroethyl vinyl ether, 2-ethylhexyl acrylate, hydroxyethyl methacrylate, butyl acrylate, butyl methacrylate, trimethylolpropane triacrylate (TMPTA), 1,6-hexanediol diacrylate (HDDA), poly(ethylene glycol) dimethacrylate, or combinations thereof. In some embodiments, the monomer can comprise Paliocolor® LC-242, Paliocolor® LC-756, Paliocolor® LC-1057, Merck RM-691, Merck RM-257, or combinations thereof. In some embodiment, the acrylate monomer can comprise a monomer selected from: Synthon Chem ST04666, Synthon Chem. ST05953, Synthon Chem. ST03021, Synthon Chem. ST06132, Synthon Chem. ST04674, Synthon Chem. ST00975, Synthon Chem. ST04315, Synthon Chem, ST03776, Synthon Chem, ST04321, Synthon Chem. ST01011, DIC Corp UCL-001-K1, DIC Corp. UCL-001-NT1. In some embodiments, the monomer can comprise BASF Paliocolor® LC-242. In some embodiments, the monomer can comprise Merck RM 257. In some embodiments, the monomer can comprise both BASF Paliocolor® LC-242 and Merck RM 257.

In some embodiments, the photoinitiator can comprise a UV irradiation photoinitiator. In some embodiments, the photoinitiator can also comprise a co-initiator. In some embodiments, the photoinitiator can comprise an α-alkoxydeoxybenzoin, α,α-dialkyloxydeoxybenzoin, α,α-dialkoxyacetophenone, α,α-hydroxyalkylphenone, O-acyl α-oximinoketone, dibenzoyl disulphide, S-phenyl thiobenzoate, acylphosphine oxide, dibenzoylmethane, phenyazo-4-diphenylsulphone, 4-morpholino-α-dialkylaminoacetophenone and combinations thereof. In some embodiments, the photoinitiator can comprise Irgacure® 184, Irgacure® 009, Irgacure® 500, Igracure® 651, Igracure® 907, Irgacure® 1117, Irgacure® 1700, Irgacure® TPO, 4,4'-bis(N,N-dimethylamino)benzophenone (Michlers ketone), (1-hydroxycyclohexyl) phenyl ketone, 2,2-diethoxyacetophenone (DEAR), benzoin, benzyl, benzophenone, or combinations thereof. In some embodiments, the photoinitiator can comprise a blue-green and/or red sensitive photoinitiator. In some embodiments, the blue-green and/or red photoinitiator can comprise Irgacure® 784, dye rose bengal ester, rose Bengal sodium salt, campharphinone, methylene blue and the like. In some embodiments, co-initiators can comprise N-phenylglicine, triethylamine, thiethanolamine and combinations thereof. While not wanting to be limited by theory, co-initiators are thought to be employed to control the curing rate of the original pre-polymer such that material properties may be manipulated. In some embodiments, the photoinitiator can comprise an ionic photoinitator. In some embodiments, the ionic photoinitiator can comprise a benzophenone, camphorquinone, fluorenone, xanthone, thioxanthone, benzyls, α-ketocoumarin, anthraquinone, terephthalophenone, and combinations thereof. In some embodiments, the photoinitiator can comprise Igracure® 907. In some embodiments, the photoinitiator can comprise Igracure® TRO. In some embodiments, the photoinitiator can comprise Igracure® 651.

In some embodiments, the thermal initiator can comprise: 4,4'-Azobis(4-cyanovaleric acid) (ACVA): α,α-azobisisobutyronitrile; 1,1'-azobis(cyclohexanecarbonitrile) (ACHN); ammonium persulfate; hydroxymethanesulfinic acid monosodium salt dihydrate (sodium formaldehydesulfoxylate); potassium persulfate; sodium persulfate; tert-butyl hydroperoxide; tert-butyl peracetate; cumene hydroperoxide; 2,5-di(tert-butylperoxy)-2,5-dimethyl-3-hexyne; dicumyl peroxide; 2,5-bis(tert-butylperoxy)-2,5-dimethylhexane (Luperox®101, Luperox® 101XL45); 24-pentanedione peroxide (Luperox® 224), 1,1-bis(tert-butylperoxy)-3,3,5-trimethylcyclohexane (Luperox® 231); 1,1-bis(tert-butylperoxy)cyclohexane (Luperox® 331M80, Luperox®531M80); benzoyl peroxide (Luprox® A98, Luprox® AFR40, Luprox® ATC50); butanone peroxide (Luprox® DDM-9, Luprox® DHD-9); tert-butyl peroxide (Luprox® DI); lauroyl peroxide (Luprox® LP); tert-butyl peroxybenzoate (Luprox® P); tert-butylperoxy 2-ethylhexyl carbonate (Luprox® TBEC); tert-butyl hydroperoxide (Luprox® TBH70X), or combinations thereof.

In some embodiments, the liquid crystal element can also comprise a surfactant. In some embodiments, the surfactant can comprise octanoic acid, heptanoic acid, hexanoic acid, and/or combinations thereof. In some embodiments, the surfactant can comprise acetylinic diol-based compounds, such as, for example, tetramethyl decynediol in a 2-ethyl hexanol solvent (Surfynol® 104A), ethoxylated acetylenic diols (Dynol® 604), dodecylbenzene sulfonate (Witconate® P-1059), Witcoamide® 511, Witcoamide® 5138, Surfynol® CT-171, Surfynol® CT-111, Surfynol® CT-131, Surfynol® TG, DBE Microemulsion, Fluorad® FC-431, Fluorad® FC-430, Surfynol® 104A, Dynol® 604, or combinations thereof.

In some embodiments, the transparency changing layer can be described as a polymer dispersed liquid crystal layer, where the liquid crystal composition forms droplets within the polymer matrix. In some embodiments, the liquid crystal droplets form as suspended precipitate during the polymerization of the polymer precursors. In some embodiments, the droplets can have a uniform distribution, a gradient distribution, or a random distribution within the polymer matrix. In some embodiments, the droplets can have a uniform distribution within the polymer matrix.

In some embodiments, as shown in FIG. 1A or FIG. 1B, the transparency changing layer can also comprise spacers 115. In some embodiments, the spacers can comprise beads. While not wanting to be confined by theory, the inventors believe that, similar to as used in the art, spacers are used to control the thickness of the liquid crystal element (i.e. defining the gap between the two alignment layers and the conducting substrates). In some embodiments, the spacers provide structural support to ensure a uniform thickness of the liquid crystal element. In some embodiments, the spacers can be comprised of silica dioxide, i.e. glass. In some embodiments, the spacers can be comprised of polymers. In some embodiments, the polymers can be comprised of divinylbenzene, polymethylmethacrylate, ploybuthymethacrylate, polymethylsilsesquioxane, polyaurylmethacrylate, polyurethane, polytetrafluoroethyiene (Teflon), benzocyclobutene (BCB), amorphous fluoropolymer (Cytop), perfluorocyclobutene, or combinations thereof. In some embodiments, the spacer beads may have an average bead diameter. In some embodiments, the average bead diameter can range from about 1 µm to about 60 µm. In some embodiments, the average bead diameter can range from about 1 µm to about 50 µm. In some embodiments, the average bead diameter can range from about 1 µm, about 5 µm, about 10 µm, about 15 µm, to about 20 µm, to about 50 µm or any combination thereof. In some embodiments, the spacers can be dispersed in a random distribution. In some embodiments, the spacers can be dispersed uniformly. In some embodiments, the liquid crystal element may contain spacers with an average spacer density ranging from about 10 spacers/in$^2$ to about 1000 spacers/in$^2$. In some embodiments, the liquid crystal element may contain spacers with an average spacer density of about 10 spacers/in$^2$, about 20 spacers in$^2$, about 25 spacers/in$^2$, about 50 spacers/in$^2$ to about 100 spacers/in$^2$, about 200 spacers/in$^2$, about 500 spacers/in$^2$, about 1000 spacers/in$^2$, or any combination thereof.

In some embodiments of the liquid crystal element, as shown in FIG. 1A or FIG. 1B, the element can also comprise at least two alignment layers, 120. In some embodiments, the first and second alignment layer can be placed on each opposing surface of the transparency changing layer, 110, such that both alignment layers bound the transparency changing layer. In other words, the alignment layers can be placed such that at least two alignment layers are in physical communication with the transparency changing layer, one with the transparency changing layer's first opposing surface and the other with the transparency changing layer's second opposing surface (e.g., one lining each side). In some embodiments, the transparency changing layer's opposing surfaces are also the transparency changing layer's surfaces that have the greatest surface areas.

In some embodiments, the alignment layers can comprise a polyimide or a modified alkyl chain. In some embodiments, where the liquid crystal compound may be characterized as having a positive dielectric anisotropy, the polyimide can be chosen such that the aforementioned liquid crystal compound is homogenously aligned with the substrate, or oriented parallel to the substrate, when there is no voltage applied. In some embodiments, the homogenous-alignment polyimide can comprise a polyimide that can be characterized as having a low pre-tilt angle. The pre-tilt angle is the angle formed between the substrate and the direction along the length of the liquid crystal compound as a result of the presence of the polyimide. In some embodiments, the homogenous-alignment polyimide can comprise a polyimide that has a pre-tilt angle of less than about 15 degrees to less than about 5 degrees. In some embodiments, the homogenous-alignment polyimide can comprise: AL3056, AL16301, AL17901, PI-2525, PI-2555, PI-2574, SE-141, SE-150, SE-4540, SE-6441, SE-7792, SE-8292, LX-1400, or combinations thereof. While not wanting to be bound by theory, the inventors believe that when a voltage is applied across the element the liquid crystals will rotate from their pre-tilt positions in response to the application of an electric field resulting in a change of index of refraction due to the change in orientation of the individual molecules. The change in the liquid crystal index of refraction within the suspended liquid crystal droplets will result in an index of refraction mismatch between the droplets and the polymer resulting in a haze or loss of transparency in the element due to light scatter. In some embodiments, where the liquid crystal compound may be characterized as having a negative dielectric anisotropy, the polyimide can be chosen such that the aforementioned liquid crystal compound is homeotropically aligned with the substrate, or oriented perpendicularly to the substrate, when there is no voltage applied. In some embodiments, the homeotropic-alignment polyimide can comprise a polyimide that has a pre-tilt angle of about 85 degrees to about 90 degrees. In some embodiments the homeotropic-alignment polyimide can comprise a polyimide that has a pre-tilt angle of about 90 degrees. In some embodiments, the homeotropic-alignment polyimide can comprise of a polyimide selected from PI 1211, 560702, S659, SE-1211, SE-5300, SE-5661, or combinations thereof. In some embodiments, the modified alkyl chain can comprise a $C_{10}$-$C_{30}$ alkyl chain where one of the end carbons is a tertiary amine salt. In some embodiments, the modified alkyl chain can comprise cetyl-trimethyl ammonium bromide (CTAB). Furthermore, the inventors believe that when the voltage is reduced or removed, the intermolecular interactions will drive to restore the individual liquid crystal compounds back to their original orientations, restoring the liquid crystal's index of refraction back to the original state and reducing mismatch and scattering in the device.

In some embodiments, the liquid crystal element can also comprise dispersants such as ammonium salts, e.g., $NH_4Cl$; Flowlen; fish oil; long chain polymers; steric acid; oxidized Menhaden Fish Oil (MFO); dicarboxylic acids such as but not limited to succinic acid, ethanedioic acid, propanedioic acid, pentanedioic acid, hexanedioic acid, heptanedioic acid, octanedioic acid, nonanedioic acid, decanedioic acid, o-phthalic acid, and p-phthalic acid; sorbitan monooleate; and mixtures thereof. In some embodiments, the dispersant can comprise oxidized MFO.

In some embodiments, the liquid crystal element can also comprise plasticizers, which include type 1 plasticizers that can generally decrease the glass transition temperature (Tg), e.g. makes it more flexible, phthalates (n-butyl, dibutyl, dioctyl, butyl benzyl, missed esters, and dimethyl); and type 2 plasticizers that can enable more flexible, more deformable layers, and perhaps reduce the amount of voids resulting from lamination, e.g., glycols (polyethylene; polyalkylene; polypropylene; triethylene; dipropylglycol benzoate).

Type 1 plasticizers can include, but are not limited to: butyl benzyl phthalate, dicarboxylic/tricarboxylic ester-based plasticizers such as but not limited to phthalate-based plasticizers such as but not limited to bis(2-ethylhexyl) phthalate, diisononyl phthalate, bis(n-butyl)phthalate, butyl benzyl phthalate, diisodecyl phthalate, di-n-octyl phthalate, diisooctyl phthalate, diethyl phthalate, diisobutyl phthalate, di-n-hexyl phthalate and mixtures thereof; adipate-based plasticizers such as but not limited to bis(2-ethylhexyl) adipate, dimethyl adipate, monomethyl adipate, dioctyl adipate and mixtures thereof; sebacate-based plasticizers such as but not limited to dibutyl sebacate, and maleate.

Type 2 plasticizers can include, but not limited to: dibutyl maleate, diisobutyl maleate and mixtures thereof, polyalkylene glycols such as but not limited to polyethylene glycol, polypropylene Glycol and mixtures thereof. Other plasticizers which may be used include but are not limited to benzoates, epoxidized vegetable oils, sulfonamides such as but not limited to N-ethyl toluene sulfonamide, N-(2-hydroxypropyl)benzene sulfonamide, N-(n-butyl)benzene sulfonamide, organophosphates such as but not limited to tricresyl phosphate, tributyl phosphate, glycols/polyethers such as but not limited to triethylene glycol dihexanoate, tetraethylene glycol diheptanoate and mixtures thereof; alkyl citrates such as but not limited to triethyl citrate, acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trimethyl citrate, alkyl sulphonic acid phenyl ester, and mixtures thereof.

In some embodiments, the liquid crystal element can also comprise binders. In some embodiments, organic binders can be used. In some embodiments, the organic binders used can comprise vinyl polymers such as but not limited to polyvinyl butyral (PVB), polyvinyl alcohol (PVA), polyvinyl chloride (PVC), polyvinyl acetate (PVAc), polyacrylonitrile, mixtures thereof and copolymers thereof; polyethyleneimine; poly methyl methacrylate (PMMA); vinyl chloride-acetate; and mixtures thereof. In some embodiments, the organic binder can comprise PVB.

In some embodiments, the liquid crystal element can also comprise a solvent as part of the method of synthesizing the element. In some embodiments, the solvent can comprise a polar solvent. In some embodiments, the polar solvent can comprise water. In some embodiments, the solvent may comprise a non-polar solvent. In some embodiments, the non-polar solvent may be an organic solvent. In some embodiments, the non-polar solvent may include, but is not limited to, a lower alkanol such as but not limited to ethanol, methanol, isopropyl alcohol, xylenes, cyclohexanone, acetone, toluene and methyl ethyl ketone, and mixtures thereof. In some embodiments, the non-polar solvent may be toluene.

Selectively Dimmable Device

In some embodiments, the selectively dimmable device can be described. As shown in FIGS. 2 and 3, in some embodiments, the selectively dimmable device, 200, can be comprised of: at least two conductive substrates, 210, the aforedescribed liquid crystal element, 100, and a voltage source. In some embodiments, the first and second conductive substrates can define a gap there between where the liquid crystal element can be disposed between the first and second conductive substrates within the said gap. In some embodiments, the liquid crystal element, the conductive substrates, and the voltage source are in all in electrical communication such that upon the application of a voltage from the voltage source, an electric field is applied across the liquid crystal element.

In some embodiments, the conductive substrates can each comprise a base, 211, where the base can be conductive. In some embodiments, each conductive substrate can further comprise an electron conductive layer, 212, in addition to the base, where the electron conduction layer is in physical communication with the base. In some embodiments with electron conduction layers, the base can be non-conductive. In some embodiments, the device can further comprise a sealant, 250, to protect the liquid crystal element from the environment. In some embodiments, the device can further comprise an adhesive layer, 260, and a removable backing, 261, to allow application to existing windows.

As shown in FIGS. 2 and 3, in some embodiments of the device the liquid crystal element integrated into the device, 100, can comprise of a polymer matrix, 112, in which the polymer dispersed liquid crystal droplets, 111, are suspended, all bound by two alignment layers, 120. In some embodiments of the device, as shown in FIG. 2, the liquid crystal droplets can comprise a positive dielectric anisotropic compound, 114. In other embodiments of the device, as shown in FIG. 3, the liquid crystal droplets can comprise a negative dielectric anisotropic compound, 113. In still other embodiments, the liquid crystal droplets can comprise of a combination of positive and negative dielectric anisotropic compounds.

In some embodiments of the device, the liquid crystal element can be chosen such that under a condition when there is no induced electric field is present, within the transparency changing layer, the index of refraction of the liquid crystal composition and the index of refraction of the polymer are similar relative to each other so that the total transmission of visible light allowed to pass through the device can be at least about 70%, at least about 75%, at least about 80%, at least about 85%, at least about 90%, at least about 95%, and/or at least about 98%. In some embodiments, when there is an electric field present, e.g. due to a voltage applied to the electrical circuit, the index of refraction of the liquid crystal and the index of refraction of the polymer can vary relative to each other so that incident light is scattered and at most only about 70%, only about 65%, only about 60%, only about 50%, only about 30%, only about 25%, only about 15%, only about 10%, only about 5% of visible light is allowed to pass through the device. In some embodiments, the magnitude of the electric field necessary achieve scattering corresponds to applying a voltage of less than 120 V, less than 110 V, less than 50 V, less than 40 V, less than 30 V, less than 20 V, less than 15 V, less than 12 V, less than 10 V, less than 5V across the device. In some embodiments, the electric field across the device is less than about 500 kV/m, less than about 1,000 kV/m, less than about 5,000 kV/m, less than about 10,000 kV/m, less than about 20,000 kV/m, less than about 40,000 kV/m to less than about 80,000 kV/m. While not wanting to be limited by theory, the effectiveness of dimming of the device can also be depicted in terms of percentage of haze, which generally can be defined as:

$$\text{Haze}[\%] = \frac{\text{Total Light Transmitted} - \text{Diffuse Light Transmitted}}{\text{Total Light Transmitted}} \times 100\%,$$

where the total light transmitted is the light from a known source and the diffuse light transmitted is the light transmitted through the element. In some embodiments, the haze of the device can be a maximum of about 5%, about 10%, about 15%, about 20%, about 25%, about 30% when no voltage is applied to the device. In some embodiments, the haze of the device can be at least about 40%, about 42%, about 45%, about 50%, about 70%, about 75%, about 85%, about 90%, about 95%, when a voltage of 25 volts or more is applied to achieve scattering. In some embodiments, the haze of the device can be at least about 50% when the voltage is about 32.5 V. In some embodiments, the haze of the device can be at least 46% when the voltage is about 30 V. In some devices, the haze can be about 42% when the voltage is about 25 V.

In some embodiments, the device can be semi-rigid or rigid. In some embodiments, the device can be flexible. In some embodiments, a selectively dimmable device can form a flexible sheet, as shown in FIG. 4, which can be applied between or on the surface of preexisting windows. In some embodiments, the conductive substrates can comprise flexible materials so that the aforementioned device may be a flexible film. In some embodiments, the flexible device may be placed in between or one side of pre-existing window glass to provide a dimming capability. In other embodiments, the device can be rigid, the base comprising inflexible materials.

In some embodiments, the conductive substrates, 210, can comprise a base, 211. In some embodiments, the base can comprise of conductive material. In some embodiments, the conductive material can comprise conductive polymers. In some embodiments, the conductive polymers can comprise poly(3,4-ethylenedioxythiophene) (PEDOT), PEDOT: poly (styrene sulfonate) (PSS), and/or combinations thereof.

In some embodiments, each conductive substrate can further comprise an electron conduction layer, 212, where the layer is in physical communication with the base. In some embodiments, the electron conduction layer is placed in direct physical communication with the base, such as a layer on top of the base. In other embodiments, the electron conduction layer may be impregnated directly into the base (e.g. ITO glass), or sandwiched in between two bases to form a single conductive substrate. In some embodiments, where there is an electron conduction layer present the base can comprise a non-conductive material. In some embodiments, non-conductive material can comprise glass, polycarbonate, polymer, or combinations thereof. In some embodiments, the substrate polymer can comprise polyvinyl alcohol (PVA), polycarbonate (PC), acrylics including but not limited to Poly(methyl methacrylate) (PMMA), polystyrene, allyl diglycol carbonate (e.g. CR-39), polyesters, polyetherimide (PEI) (e.g. Ultem®), Cyclo Olefin polymers (e.g. Zeonex®), triacetylcellulose (TAC), polyethylene terephthalate (PET), polyethylene naphthalate (PEN), or combinations thereof. In some embodiments, the substrate can comprise polyethylene terephthalate (PET), polyethylene naphthalate (PEN), or a combination thereof. In some embodiments, the electron conduction layer can be comprised of a transparent conductive oxide, conductive polymer, metal grids, carbon nanotubes (CNT), graphene, or a combination thereof. In some embodiments, the transparent conductive oxide can comprise a metal oxide. In some embodiments, the metal oxide can comprise iridium tin oxide (IrTO), indium tin oxide (ITO), fluorine doped tin oxide (FTO), doped zinc oxide, or combinations thereof. In some embodiments, the metal oxide can comprise indium tin oxide incorporated onto the base, e.g. ITO glass, ITO PET, or ITO PEN.

In some embodiments, as shown in FIGS. 2 and 3, the selectively dimmable device can also comprise a sealant, 250. In some embodiments, the sealant can encapsulate liquid crystal element between the conductive substrates to protect the element from the environment. In some embodiments, the sealant can comprise a two-part real time cure epoxy, 3-Bond 2087, or the like. In some embodiments, the sealant can comprise a UV-curable photopolymer, such as NOA-61, or the like. In some embodiments, as shown in FIG. 4, the selectively dimmable device can also comprise an adhesive layer, 260. In some embodiments, the adhesive layer will allow a flexible sheet embodiment of the aforementioned device to be installed on pre-existing windows. In some embodiments, the adhesive can comprise an optically clear adhesive (OCA). In some embodiments, the OCA can comprise OCA products commercially available and known to those skilled in the art (e.g. Nitta OCA tape, Scapa OCA tape). In some embodiments, the selectively dimmable device can also comprise a removable carrier substrate, 261, to protect the adhesive layer from contamination which will be peeled away before the device's application.

EXAMPLES

It has been discovered that embodiments of the liquid crystal composition and related reverse-mode polymer dispersed liquid crystal elements and devices described herein provide the ability for a selectively dimmable surface. These benefits are further shown by the following examples, which are intended to be illustrative of the embodiments of the disclosure, but are not intended to limit the scope or underlying principles in any way.

In general, the preparation of the compounds was performed in an argon atmosphere (Airgas, San Marcos, Calif. USA) inside of a fume-hood. In addition, where degassing is mentioned it can be performed by bubbling of argon (Airgas) through the compound or other similar methods.

Example 1.4: Synthesis of Precursor 41 (P-1)

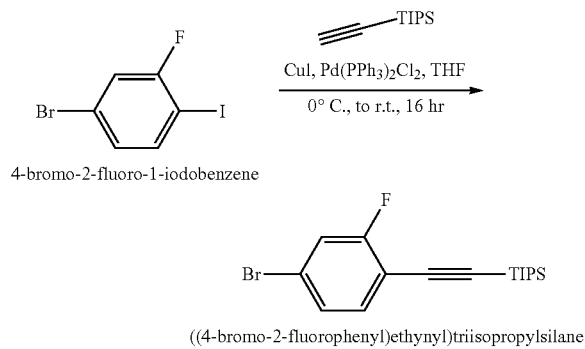

((4-bromo-2-fluorophenyl)ethynyl)triisopropylsilane (IC-1): To a solution of CuI (0.57 g, 3.0 mmol; Sigma Aldrich, St, Louis, Mo. USA), Pd(PPh$_3$)$_2$Cl$_2$ (0.7 g, 1.0 mmol; Aldrich), TEA (20.2 g, 0.2 mmol; Aldrich) and anhydrous THF (100 ml; Aldrich) in an ice bath, 4-bromo-2-fluoro-1-iodobenzene (30.1 g, 100 mmol; Aldrich) was added to the mixture and stirred at 0° C. Then ethynyltrimethylsilane (18.23 g, 100 mmol; Aldrich) was added drop wise over a 1 hour period. The resulting mixture was then allowed to warm to room temperature and then stirred for 16 hours. The resulting mixture was then poured into diethyl ether (~50 mL; Aldrich). The resulting solution can be filtered and rinsed three times with DI water (EMD Millipore, Billerica, Mass. USA). The organic layer can be separated, dried with MgSO$_4$ (anhydrous; Aldrich). The crude product can then be purified by flash column with silica gel (Aldrich), eluting with hexanes (Aldrich) to give an oil product, ((4-bromo-2-fluorophenyl)ethynyl)triisopropylsilane, or IC-1 (35.5 g, 100% yield).

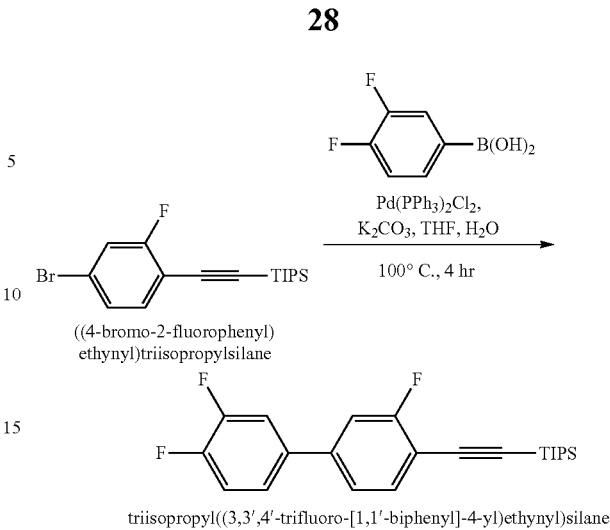

Triisopropyl((3,3',4'-trifluoro-[1,1'-biphenyl]-4-yl)ethynyl)silane (IC-2): A solution of Pd$_2$(PPh$_3$)$_2$Cl$_2$ (280 mg, 0.4 mmol; Aldrich), K$_2$CO$_3$ (5.6 g, 40 mmol; Aldrich), (3,4-difluorophenyl)boronic acid (3.8 g, 24 mmol; Aldrich) can be added to a mixture of DI water (20 mL; Millipore) and THF (20 mL; Adrich) and then the mixture degassed for 20 minutes. Then IC-1 (7.017 g, 20 mmol) can be added and the mixture degassed for an additional 20 minutes. Next, the reaction can be heated to 100° C. for 4 hours. The resulting mixture can then be removed from the heat, cooled, and poured into DI water (300 mL; Millipore) and extracted with toluene (50 mL; Aldrich). The combined organic layers can then be washed twice with DI water (2×35 mL; Millipore), and then dried over Na$_2$SO$_4$ (anhydrous; Aldrich). After concentration in vacuo, the resulting liquid can be purified via flash chromatography on silica gel (Aldrich) and 1:1 hexanes Et$_2$O (Aldrich) to yield a colorless solid, triisopropyl((3,3',4'-trifluoro-[1,1'-biphenyl]-4-yl)ethynyl)silane, or IC-2 (4.41 g, 96.25% yield).

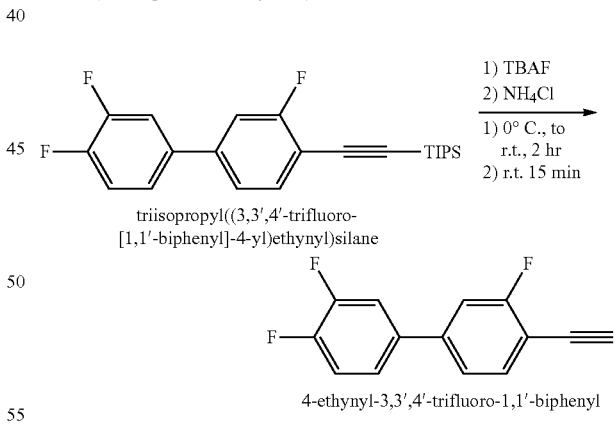

4-ethynyl-3,3',4'-trifluoro-1,1'-biphenyl (P-1): To a solution of TBAF (1M sol. in THF, 48.12 mL, 48.12 mmol; Aldrich) in an ice bath was added a solution of IC-2 (7.48 g, 19.25 mmol) in THF (200 mL; Aldrich) over a 15 minute period. The resulting mixture was then allowed to warm to room temperature and stirred for 2 hours. Then the solution was then poured into NH$_4$Cl aqueous solution (100 mL, sat. eq. sol.; Aldrich), The mixture was then stirred at room temperature for 15 minutes and then diluted with diethyl ether (200 mL; Aldrich), filtered, and then concentrated. The resulting liquid was purified via flash chromatography on silica gel (Aldrich) and 1:1 hexanes:Et$_2$O (Aldrich) to yield a colorless solid, 4-ethynyl-3,3',4'-trifluoro-1,1' biphenyl, or P-1 (4.41 g, 98.7% yield). LCMS: M+H=233. $^1$H NMR (400 MHz, DMSO-d$_6$) δ 7.89 (ddd, J=12.3, 7.8, 2.3 Hz, 1H), 7.71 (dd, J=11.3, 1.6 Hz, 1H), 7.66-7.60 (m, 2H), 7.60-7.49 (m, 2H), 4.58 (d, J=0.7 Hz, 1H).

Example 1.5: Synthesis of Precursor #2 (P-2)

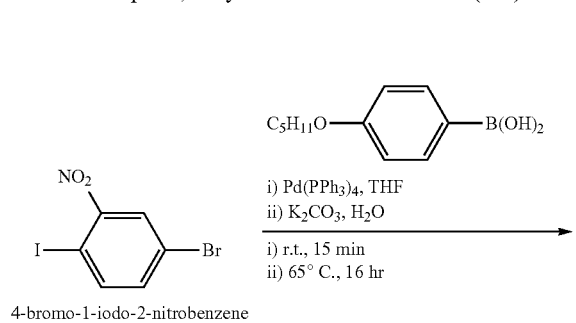

4-bromo-2-nitro-4'-(pentyloxy)-1,1'-biphenyl (P-2): A mixture of 4-bromo-1-iodo-2-nitrobenzene (3.289 g, 10.0 mmol; Combi-Blocks Inc., San Diego, Calif. USA), (4-(pentyloxy)phenyl)-boronic acid (2.288 g, 11.0 mmol; Aldrich), Pd(PPh$_3$)$_4$ (0.231 g, 0.2 mmol; Aldrich) and THF (50 mL; Aldrich) was stirred and bubbled with Argon (Airgas) for 15 minutes at room temperature. Then a mixture of K$_2$CO$_3$ (2.764 g, 20.0 mmol; Aldrich) in DI water (5.0 mL; Millipore) was added to above mixture. The resulting mixture was then bubbled with Argon (Airgas) for 15 minutes then stirred at 65° C. for 16 hours. After cooling to room temperature, the mixture was poured into DI water (20 mL; Millipore), then extracted into ethyl acetate (Aldrich). The organic layer was separated, washed with DI water (20 mL; Millipore), dried over MgSO$_4$ (anhydrous; Aldrich), filtered and concentrated to dryness under reduced pressure. The residue was purified by silica gel (Aldrich) column chromatography with hexane:ethyl acetate (95:5) (Aldrich) to gain a light yellow color solid, P-2 (4.589 g, 63% yield). LCMS: Rf=3.06 min, M−H=363.

Example 1.6: Synthesis of Precursor #3

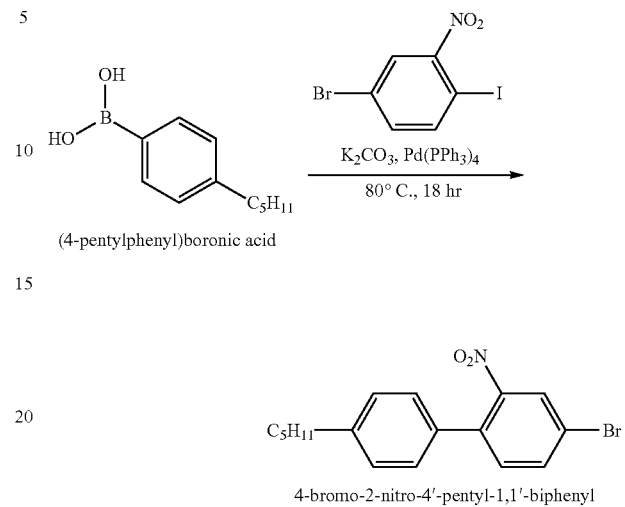

4-bromo-2-nitro-4'-pentyl-1,1'-biphenyl (P-3): To the solution of 4-bromo-1-iodo-2-nitrobenzene (985 mg. 3 mmol; Combi-Blocks), (4-pentylphenyl)boronic acid (690 ma, 3.6 mmol; Combi-Blocks) in 30 mL of THF:H$_2$O solution (2:1) (Aldrich:Millipore) was added K$_2$CO$_3$ (1.24 g, 9 mmol; Aldrich). The reaction mixture was degassed with nitrogen gas (Airgas), and then was added Pd(PPh$_3$)$_4$ (173 mg, 0.15 mmol; Aldrich). The resulting solution was then stirred under nitrogen at 80° C. for 18 hours. The reaction mixture was then diluted with DI water (50 mL; Millipore) and extracted with EtOAc (3×30 mL; Aldrich). Organic fractions were collected, washed with brine, dried over MgSO$_4$ (anhydrous; Aldrich), filtered and solvent was removed in a vacuum. The crude product was then purified by column flash chromatography (Combi-Flash silica gel column; Hexane:EtOAc 2% (Aldrich)) to give an orange oil, P-3 (930 mg, 89% yield). $^1$H NMR (400 MHz, DMSO-d$_6$) δ 8.23 (d, J=2.0 Hz, 1H), 7.94 (dd, J=8.3, 2.1 Hz, 1H), 7.50 (d, J=8.3 Hz, 1H), 7.28 (d, J=8.3 Hz, 2H), 7.24 (d, J=8.3 Hz. 2H), 2.61 (dd, J=8.7, 6.7 Hz, 2H), 1.66-1.54 (m, 2H), 1.25-1.35 (m, 4H), 0.87 (t, J=6.9 Hz, 3H). MH$^+$=not ionized.

Example 2.1 Synthesis of Liquid Crystal #1

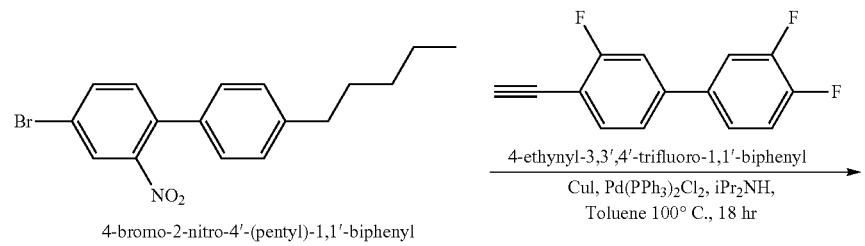

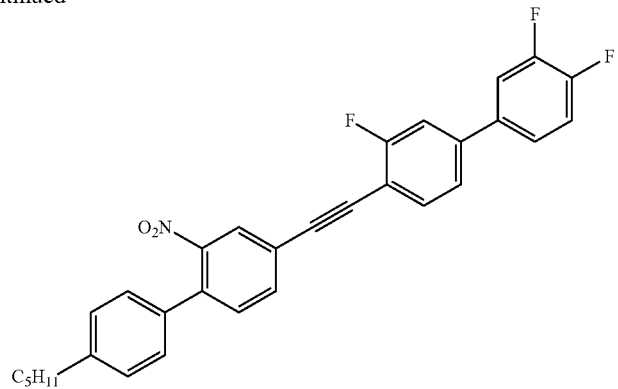

3,3′,4-trifluoro-4′-((2-nitro-4′-pentyl-[1,1′-biphenyl]-4-yl)ethynyl)-1,1′-biphenyl 3,3′,4-trifluoro-4′-((2-nitro-4′-(pentyl)[1,1′-biphenyl]-4-yl)ethynyl)-1,1′-biphenyl (IC-3): A mixture of P-3 (500 mg, 1.44 mmol), P-1 (500 mg, 2.16 mmol), CuI (27 mg, 0.14 mmol; Aldrich), Pd(PPh$_3$)$_2$Cl$_2$ (100 mg, 0.14 mmol; Aldrich) and diisopropylamine (2.0 mL, 14.27 mmol; Aldrich) in toluene (10 mL, anhydrous; Aldrich) was bubbled with nitrogen (Airgas) for 10 minutes before being stirred at 100° C. under nitrogen (Airgas) atmosphere for 18 hours. After cooling to room temperature, the mixture was poured into DI water (50 mL; Millipore); the product was then extracted into ethyl acetate (3×30 mL; Aldrich). The resulting organic fractions were collected, washed with brine (Aldrich), and dried over MgSO$_4$ (anhydrous; Aldrich), filtered and concentrated to dryness in a vacuum. The residue was purified by column chromatography on silica gel (Combi-Flash silica gel column) eluting with hexane:ethyl acetate (95:5) (Aldrich) to gain yellow oil, or IC-3 (750 mg, 100% yield). $^1$H NMR (400 MHz, DMSO-d$_5$) δ 8.17 (d, J=1.7 Hz, 1H), 7.94 (ddd, J=12.2, 7.8, 2.3 Hz, 1H), 7.91 (dd, J=8.0, 1.7 Hz, 1H), 7.85-7.72 (m, 2H), 7.71-7.65 (m, 2H), 7.63 (d, J=8.0 Hz, 1H), 7.56 (dt, J=10.6, 8.5 Hz, 1H), 7.29 (d, J=3.5 Hz, 4H), 2.62 (dd, J=8.7, 6.7 Hz, 2H), 1.65-1.54 (m, 2H), 1.36-1.28 (m, 4H), 0.88 (t, J=6.9 Hz, 3H). MH+=not ionized.

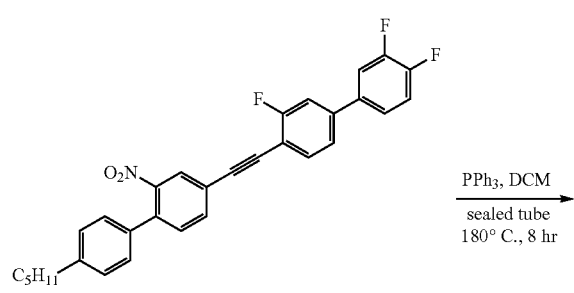

3,3′,4-trifluoro-4′-((2-nitro-4′-(pentyl)-[1,1′-biphenyl]-4-yl)ethynyl)-1,1′-biphenyl PPh$_3$, DCM
sealed tube
180° C., 8 hr

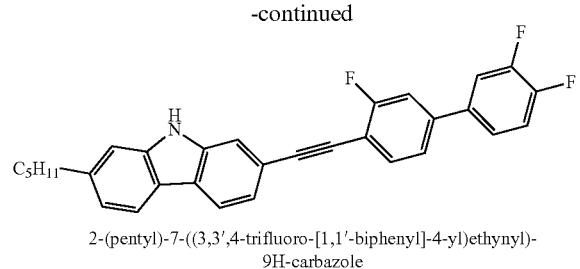

2-(pentyl)-7-((3,3′,4-trifluoro-[1,1′-biphenyl]-4-yl)ethynyl)-9H-carbazole 2-pentyl-7-((3,3′,4′-trifluoro-[1,1′-biphenyl]-4-yl)ethynyl)-9H-carbazole (LC-1): A mixture of IC-3 (76 g, 1.52 mmol), and triphenyl-phospine (1.0 g, 3.8 mmol; Aldrich) in DCM (20 mL; Aldrich) was placed in a sealed tube and heated to 180° C. for 5 hours. After concentration in vacuum the mixture was diluted with a mixture of DCM and hexane (1:1) (Aldrich). The precipitated product was filtered off, washed with methanol (20 mL; Aldrich) and dried in a vacuum to give an off-white powder, or LC-1 (0.2 g, 26% yield). $^1$H NMR (400 MHz, DMSO-d$_6$) δ 11.31 (s, 1H), 8.12 (d, J=8.0 Hz, 1H), 8.04 (d, J=8.0 Hz, 1H), 7.95 (ddd, J=12.2, 7.8, 2.3 Hz, 1H), 7.82-7.72 (n, 2H), 7.71-7.64 (m, 3H), 7.57 (dt, J=10.6, 8.5 Hz, 1H), 7.36-7.31 (m, 2H), 7.05 (dd, J=8.1, 1.4 Hz, 1H), 2.75 (t, J=7.6 Hz, 2H), 1.67 (p, J=7.4 Hz, 2H), 1.43-1.24 (m, 4H), 0.88 (t, J=6.9 Hz, 2H). MH$^+$=468.

Example 2.2: Synthesis of Additional Liquid Crystal Compounds (Prophetic)

Using analogously methods to those described in Example 2.1, the following compounds can be synthesized by substituting (4-(pentyl)phenyl)-boronic acid with the appropriate 4-R-phenyl-boronic acid, where R is the desired alkyl:

(1) 2-ethyl-7-((3,3′,4′-trifluoro-[1,1′-biphenyl]-4-yl)ethynyl)-9H-carbazole, or LC-2;

(2) 2-propyl-7-((3,3′,4′-trifluoro-[1,1′-biphenyl]-4-yl)ethynyl)-9H-carbazole, or LC-3;

(3) 2-butyl-7-((3,3′,4′-trifluoro-[1,1′-biphenyl]-4-yl)ethynyl)-9H-carbazole, or LC-4:

(4) 2-hexyl-7-((3,3′,4′-trifluoro-[1,1′-biphenyl]-4-yl)ethynyl)-9H-carbazole, or LC-5;

(5) 2-heptyl-7-((3,3',4'-trifluoro-[1,1'-biphenyl]-4-yl)ethynyl)-9H-carbazole, or LC-6; or (6) 2-octyl-7-((3,3',4'-trifluoro-[1,1'-biphenyl]-4-yl)ethynyl)-9H-carbazole, or LC-7.

Example 2.3 Synthesis of Liquid Crystal #8 (LC-8)

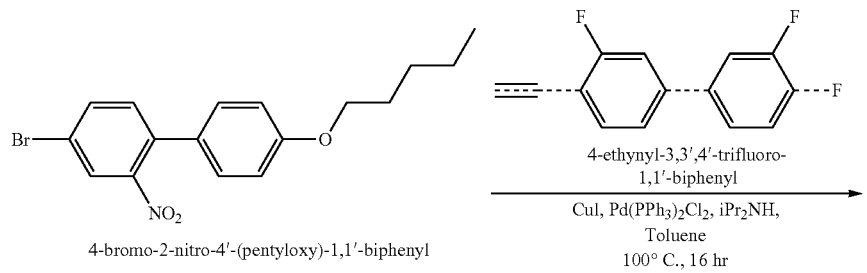

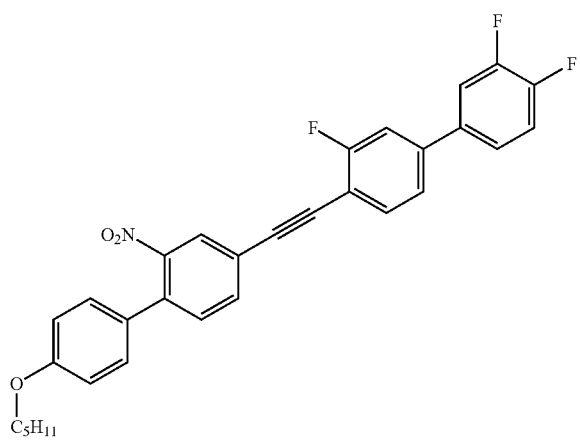

3,3',4-trifluoro-4'-((2-nitro-4'-(pentyloxy)-[1,1'-biphenyl]-4-yl)ethynyl)-1,1'-biphenyl 3,3',4-trifluoro-4'-((2-nitro-4'-(pentyloxy)-[1,1'-biphenyl]-4-yl)ethynyl)-1,1'-biphenyl (IC-4): A mixture of P-2 (440 mg, 1.208 mmol), P-1 (440 mg, 1.894 mmol), CuI (23 mg, 0.120 mmol; Aldrich), Pd(PPh$_3$)$_2$Cl$_2$ (140.4 mg, 0.2 mmol; Aldrich) and diisopropylamine (2.0 mL, 14.27 mmol; Aldrich) in toluene (5 mL; Aldrich) was bubbled with Argon (Airgas) for 15 minutes before being stirred at 100° C. under nitrogen (Airgas) atmosphere for 16 hours. After cooling to room temperature, the mixture was poured into DI water (20 mL; Millipore); the product was then extracted into ethyl acetate (Aldrich). The resulting organic layer was separated, washed with DI water (20 mL; Millipore), dried over MgSO$_4$. (anhydrous; Aldrich), filtered and concentrated to dryness under reduced pressure. The residue was purified by column chromatography on silica gel (Aldrich) eluting with hexane:ethyl acetate (95:5) (Aldrich) and then recrystallized from hexane:ethyl acetate (95:5) (Aldrich) to gain light yellow needle crystals, or IC-4 (554 mg, 89% yield). LCMS: Rf=3.06 min, M−H=515.

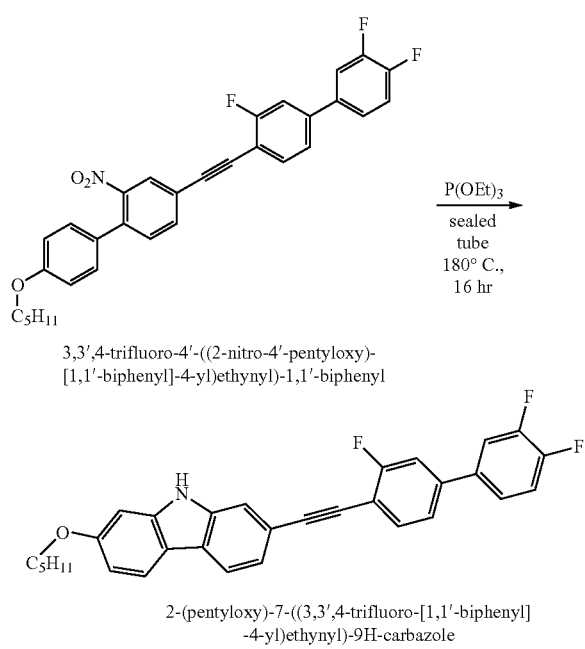

3,3',4-trifluoro-4'-((2-nitro-4'-pentyloxy)-[1,1'-biphenyl]-4-yl)ethynyl)-1,1'-biphenyl 2-(pentyloxy)-7-((3,3',4-trifluoro-[1,1'-biphenyl]-4-yl)ethynyl)-9H-carbazole 2-(pentyloxy)-7-((3,3',4'-trifluoro-[1,1'-biphenyl]-4-yl) ethynyl)-9H-carbazole (LC-8): A mixture of IC-4 (60 mg, 0.116 mmol), in triethyl phosphite (0.24 mL, 236 mg, 0.9 mmol; Aldrich) was placed in a sealed tube and heated to 180° C. for 16 hours. After cooling to room temperature, the mixture was then poured into DI water (20 mL; Millipore); the product was then extracted into ethyl acetate (Aldrich). The resulting organic layer was then separated, washed with DI water (20 mL, Millipore), dried over $MgSO_4$ (anhydrous; Aldrich), filtered and concentrated to dryness under reduced pressure. The residue was purified by column chromatography over silica gel (Aldrich) eluting with hexane:ethyl acetate (95:5) (Aldrich) then re-crystallized from ethanol (Aldrich) to gain off white solid, or LC-8 (52.4 mg, 93% yield). LCMS: Rf=3.853 min, M+H=485. $^1$H NMR (400 MHz, DMSO-$d_6$) δ 11.27 (s, 1H), 8.05 (d, J=8.0 Hz, 1H), 8.00 (d, J=8.6 Hz, 1H), 7.94 (ddd, J=12.2, 7.8, 2.3 Hz, 1H), 7.78 (dd, J=11.2, 1.8 Hz, 1H), 7.74 (t, J=7.9 Hz, 1H), 7.70-7.61 (m, 3H), 7.56 (dt, J=10.6, 8.6 Hz, 1H), 7.32 (dd, J=8.0, 1.5 Hz, 1H), 7.00 (d, J=2.2 Hz, 1H), 6.80 (dd, J=8.6, 2.2 Hz, 1H), 4.06 (t, J 6.5 Hz, 2H), 1.77 (p, J=6.7 Hz, 2H), 1.52-1.30 (m, 4H), 0.92 (t, J=7.1 Hz, 3H).

Example 2.4: Synthesis of Additional Liquid Crystal Compounds (Prophetic)

Using analogously methods to those described in Example 2.1, the following compounds can be synthesized by substituting (4-(pentyloxy)phenyl)-boronic acid with the appropriate 4-R-phenyl-boronic acid, where R is the desired alkyloxy:

(1) 2-ethyloxy-7-((3,3',4'-trifluoro-[1,1'-biphenyl]-4-yl) ethynyl)-9H-carbazole, or LC-9;
(2) 2-propyloxy-7-((3,3',4'-trifluoro-[1,1'-biphenyl]-4-yl) ethynyl)-9H-carbazole, or LC-10;
(3) 2-butyloxy-7-((3,3',4'-trifluoro-[1,1'-biphenyl]-4-yl) ethynyl)-9H-carbazole, or LC-11;
(4) 2-hexyloxy-7-((3,3',4'-trifluoro-[1,1'-biphenyl]-4-yl) ethynyl)-9H-carbazole, or LC-12;
(5) 2-heptyloxy-7-((3,3',4'-trifluoro-[1,1'-biphenyl]-4-yl) ethynyl)-9H-carbazole, or LC-13; or
(6) 2-octyloxy-74(3,3',4'-trifluoro-[1,1'-biphenyl]-4-yl)ethynyl)-9H-carbazole, or LC-14.

Example 3.1 Composition Polarization Observations

The synthesized compounds were examined with an optical microscope in a crossed polarization lighting condition to characterize their liquid crystal behavior and to study the composition's birefringence, or the difference between high and low refractive index of anisotropic liquid crystal molecules.

For the setup, a microscope (BX-53F; Olympus, Tokyo, Japan) was setup for polarizing microscopy with the analyzer attachment (U-PA, Olympus) rotated 90 degrees from the polarizer filter (BX45-PO. Olympus) all within the optical path from an adjustable 100 watt halogen light attachment (U-LH100HG, Olympus). In addition, to capture the images the microscope was also equipped with a video camera adapter (U-TVO0.35XC-2, Olympus) which was further connected to a computer for capturing the images. For measurement, the samples were placed on the microscope's stage placing it in the halogen lamp's optical path between the polarizer and the analyzer. Since the polarization between the analyzer and polarizer are completely mismatched by 90 degrees, if the sample is isotropic, e.g. glass, the light emitted from the source would be nearly completely blocked by the second polarizer because the unblocked polarized light exiting the first polarizer would not bend and would be subsequently blocked by the analyzer. The blockage of the remaining light by the mismatched analyzer is due to the inability of isotropic materials to change the polarization direction of light passing through them. However, if an anisotropic sample is placed in between both polarizer films, the polarized light passing through the sample material can change polarization if the sample exhibits birefringence properties resulting in a light component that will not be blocked by the analyzer, or a detected interference pattern. Since glass is isotropic and has minimal effect light polarization, the liquid crystal compositions were sandwiched between two glass substrates during the measurements.

In addition to the microscope setup, a heating stage (FP 82 HT, Mettler Toledo, Columbus, Ohio, USA) and associated controller (FP 90, Mettler Toledo) was used to heat the samples sandwiched in glass to preset temperatures right before measurements were taken. The purpose was to determine the birefringence properties of the samples at specific temperatures in order to determine their phase as a function of temperature.

If a nematic or smectic phase was present after cooling and the samples exhibited birefringence, it was detected as transformed light component at the microscope or an interference pattern of light. If the material was in an isotropic phase, it was observed by the detection of no discernible light at the microscope, or darkness due to no transformation of light and subsequent blockage by the second polarizer.

For the measurements, selected liquid crystal compositions, made as described above, were measured. Starting at 20° C., an image was captured to baseline the mixture phase. Then, during first heating cycle the liquid crystal molecules in the sample were heated at a rate of 20° C. per minute until a black image was observed, which indicated an isotropic phase change, and the temperature was recorded. Then during cooling, when an interference color image was observed as a result of the samples transition back to nematic from isotropic, the phase transition temperature was re-verified and an image was recorded. Then, during second heating cycle, the samples were heating at a heating rate of 5° C. per min in order to carefully record the phase change temperatures. The compounds created appeared to have a smectic and nematic phases, as shown in Table 1.

TABLE 1

Observed Transition Temperatures for Various Compositions.

| Comp. | Additional Compounds | Phase Transition Temp [° C.] |
|---|---|---|
| COMP-1 | LC-1 (100 wt %) | C 196 Sm 280 N 300 I |
| COMP-2 | LC-8 (100 wt %) | C 187 Sm 304 N 320 I |

Example 4.1: Fabrication of LC-Based Dimmable Device Using Capillary Method

In Example 4.1, a selectively dimmable device based on a carbazolyl-based liquid crystal compound with positive dielectric anisotropy can be fabricated using a capillary method for filling the liquid crystal cell. For the capillary method, a homogeneous-type liquid crystal test cell (KSRO-101B107M1NSS05, E.H.C Co. Ltd, Tokyo, Japan) was used for making the device. The test cell comprised of two substrates with supports that defined an active alignment area in between the two substrates. The size of the glass/ITO substrate was 20 mm×25 mm with a sheet resistance about 100 Ω/sq and the active alignment area was about 10 mm×10 mm with a cell gap of 10 µm. The cell was procured pre-coated with a polyamide alignment layer (LX-1400, Hitachi-Kasei Shoji Co., Ltd., Tokyo, Japan) so no application of the alignment layers was necessary. Also, because of the geometry of the cell included supports to ensure preservation of the cell gap, so separate spacers were not required to be inserted into the cell before application of the liquid crystals.

First, the test cell was baked at 150° C. for 30 min before injection of liquid crystal mixture to remove any impurities and any vapors inside the chamber. The liquid crystal mixture was then prepared by first mixing liquid crystal composition corresponding to device DD-1 in Table 2 along with the disclosed amounts of polymer precursors, reactive mesogen, LC-242 (BASF Corporation, Florham Park, N.J., USA), chiral dopant, R-811 (Merck), and photo initiator, Irgacure 651 (BASF) in an vortex mixer to mix the formulation followed by heating on a hot plate to at or above the mixture clearing point and then cooling to about 80° C. to result a liquid crystal mixture, or a hot coating formulation.

Next, the test cells were pretreated for the liquid crystal injection by warming the substrates at 80° C. for 5 minutes on a hot plate. Then, the hot coating formulation was injected near the opening of the test cell. The solution was then allowed to enter into the test cell by capillary action until it coated the entire active alignment area. In some embodiments, the test cell was put on hot plate after injecting coating formulation to help ensure homogenous coverage of the liquid crystal. After soft baking, the result was a layered cell assembly, ready for ultraviolet (UV) radiation curing (UV-curing).

Then, the layered cell assembly was put on a stainless steel plate to provide a thermal sink so that the cell did not overheat during UV-curing. The assembly was then cured under a UV LED (365 nm, LEDLB-4E-UV-365 NM; Larson Electronics LLC, Kemp, Tex. USA) at an output of about 30 mW/cm$^2$ incident power for 3 minutes on each side to photopolymerize the LC-242. To keep the temperatures of the assembly from localized blooming as a by-product of the UV irradiation, the orientation of the sample was switched at approximately 3-minute intervals by flipping the assembly over. The result is an unsealed, dimmable assembly.

After UV-curing, the edges can be optionally sealed with a sealant to protect the liquid crystal element. After encapsulation, the assembly can then be baked in an oven at 80° C. for 30 minutes, which will result in a sealed, dimmable assembly.

Next, the dimmable assembly can be placed in electrical communication with a voltage source by electrically by attaching a conducting clamp and wire in electrical communication with a voltage source to each conductive substrate such that when a voltage is applied across the voltage source, an electrical field is applied across the liquid crystal.

While not wanting to be limited by theory it is thought that the voltage source will provide the necessary electrical field across the device to rotate the dispersed liquid crystals resulting in a mismatch of the index of refraction the liquid crystal element. The result was selectively dimmable device #1 (DD-1).

Example 4.2: Fabrication of Additional LC-Based Dimmable Devices

In Example 4.2, additional devices were formulated using the same methodology as in Example 4.1 with the exception that the mass ratios and additives were varied according to Table 2. Suppliers for the individual compounds are the following: MLC-2142 (EMD Chemicals, Gibbstown, N.J., USA); 5CB, 3OCB, 5OCB, 8OCB, 5CT, and 5P3PrB (Qingdao QY Liquid Crystal Co., Ltd., Chengyang, Qingdao, China); and R-811 (Merck, Kenilworth, N.J. USA).

TABLE 2

Variances between the Fabricated Dimmable Elements.

| Element | Example | Liquid Crystal Components | Polymer | Polyimide | Dielectric Anisotropy | Process |
|---|---|---|---|---|---|---|
| DD-1 | Example 4.1 | LC-1 (1 wt %) 5CB (34 wt %) 3OCB (12 wt %) 5OCB (9 wt %) 8OCB (12 wt %) 5CT (8 wt %) 5P3PrB (15 wt %) | LC-242 (5 wt %) R-811 (3 wt %) Igracure 651 (1 wt %) | LX-1400 | Positive | Layer |

TABLE 2-continued

Variances between the Fabricated Dimmable Elements.

| Element | Example | Liquid Crystal Components | Polymer | Polyimide | Dielectric Anisotropy | Process |
|---|---|---|---|---|---|---|
| CDD-1 | Example 4.2 | 5CB (30 wt%)<br>3OCB (10.5 wt %)<br>5OCB (8 wt %)<br>8OCB (10.5 wt %)<br>5CT (7 wt %)<br>5P3PrB (25 wt %) | LC-242 (5 wt %)<br>R-811 (3 wt %)<br>Igracure 651 (1 wt% ) | LX-1400 | Positive | Layer |
| CDD-2 | Example 4.2 | 5CB (41 wt %)<br>3OCB (14.5 wt %)<br>5OCB (11 wt %)<br>8OCB (14.5 wt %)<br>5CT (10 wt %) | LC-242 (5 wt %)<br>R-811 (3 wt %)<br>Igracure 651 (1 wt %) | LX-1400 | Positive | Layer |

Example 5.1. Optical Measurements

In Example 5.1, the optical characteristics of the fabricated dimmable devices was characterized by measuring the light allowed to pass though each, both with and without an electric field present. Light transmittance data for the samples was measured using a haze meter (HM-150; Murakami Color Research Laboratory, Tokyo, Japan) with each respective sample placed inside the device. The source was directly measured without any sample present to provide a baseline measurement of total light transmitted. Then, the samples were placed directly in the optical path, such that the emitted light passes through the samples. Then the sample, connected to a voltage source (3PN117C Variable Transformer; Superior Electric, Farmington, Conn., USA) via electrical wires, one wire connected to each terminal and to a respective ITO glass substrate on the device such that an electric field would be applied across the device when a voltage source is energized or a voltage applied, was placed into the haze meter. Then, the emitted light transmitted through the samples was measured, at first with no voltage applied and then again at various magnitudes of voltage, ranging from 0 volts to an upper voltage, depending on the behavior of the sample ranging from 12 volts to a maximum of 50 volts; with haze measurements taken at the different voltage levels.

Figure 5:
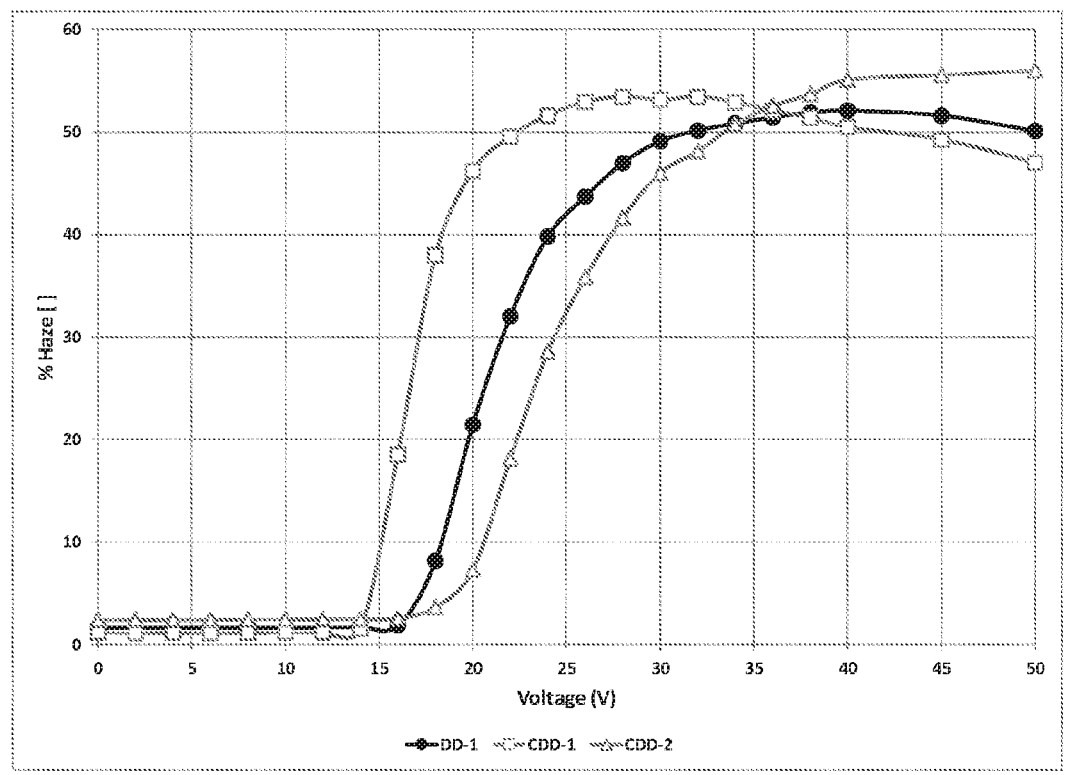
FIG. 5 is a plot showing results between dimmable device #1 and comparative dimmable devices #1 and 42.

The results for the measurements taken thus far are presented in FIG. 5. FIG. 5 shows that the comparison of one containing a device based on the LC-1 compound (DD-1) and two devices based on comparative mixtures DD-2 and DD-3. It was observed that while both CDD-1 had a haze transition at a lower voltage than DD-1, as the voltage increased it experienced degradation in haze far more pronounced than DD-1. For CDD-2, while there was not a haze degradation until higher voltages, CDD-2 required higher voltages for the haze transition as compared to DD-1. The measurements indicate that the LC-1 and similar liquid crystal compounds can be suitable for reverse-mode PLDC dimmable window applications.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims, Other modifications that may be employed are within the scope of the claims. Thus, by way of example, but not of limitation, alternative embodiments may be utilized in accordance with the teachings herein. Accordingly, the claims are not limited to embodiments precisely as shown and described.

EMBODIMENTS

The following embodiments are specifically contemplated by the authors of the present disclosure.

Embodiment 1. A liquid crystalline composition comprising a compound represented by Formula 1:

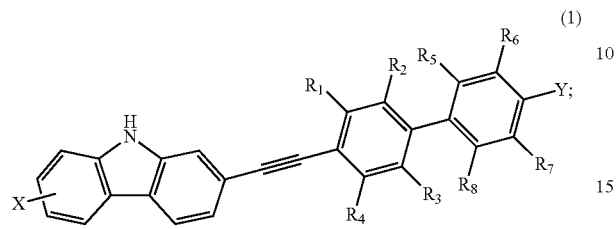

(1)

wherein the carbazolyl is unsubstituted or substituted with one, two, or more of: a $C_{1-6}$ alkyl, a $C_{1-6}$ alkyloxy, —F, —$CF_3$, or —OCF3; $R_1$ thru $R_5$ are independently: —H, a $C_{1-6}$ alkyl, a $C_{1-6}$ alkyloxy, —$CF_3$, or —$OCF_3$; X is a $C_{2-12}$ alkyl or a $C_{2-12}$ alkyloxy, where any non-consecutive $CH_2$ can be optionally substituted with —O—, —B—, or —S—; and Y is a: —F, —CN, —$CF_3$, —$OCF_2$, —$OCF_3$, or —NCS.

Embodiment 2. The composition of embodiment 1, wherein X is selected from:

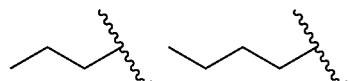

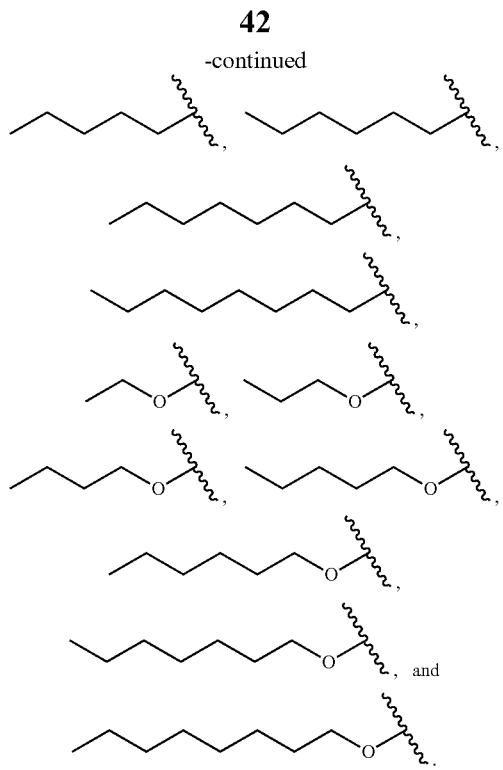

Embodiment 3. The composition of embodiment 1 or 2, wherein the composition comprises a compound represented by:

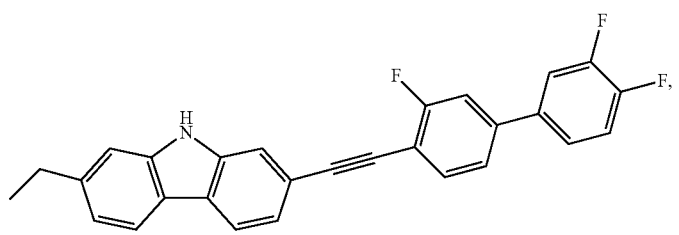

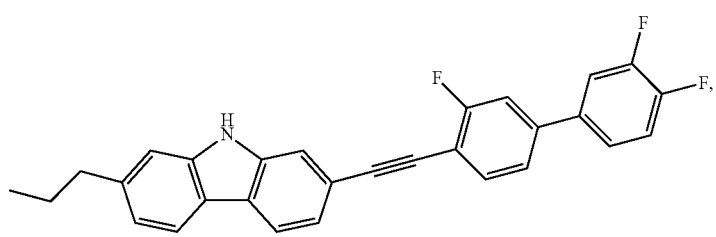

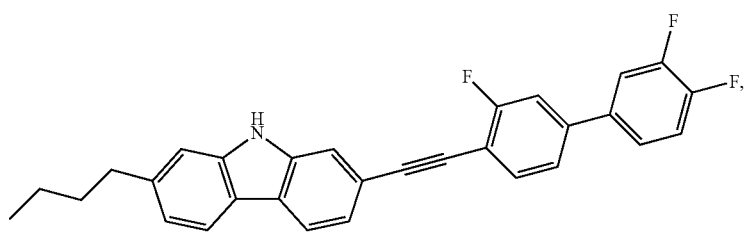

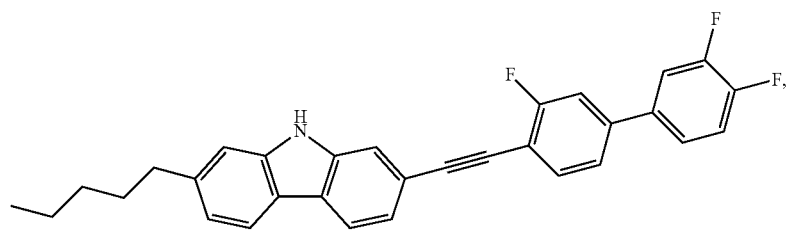
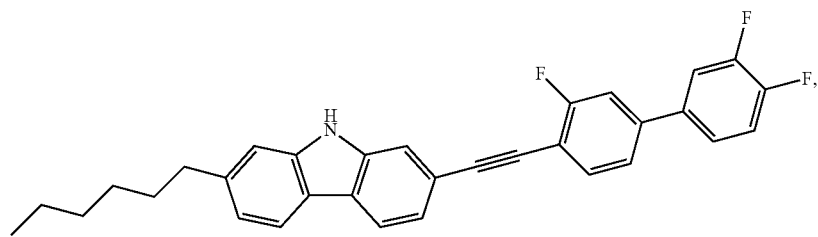
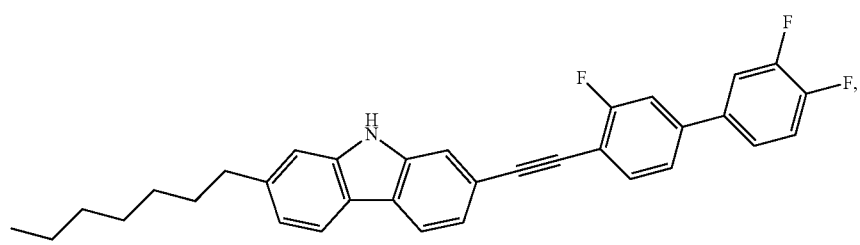
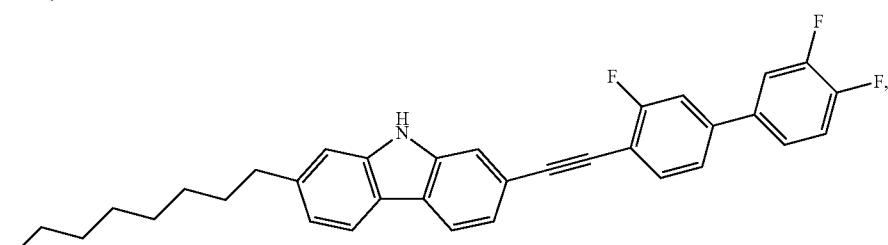
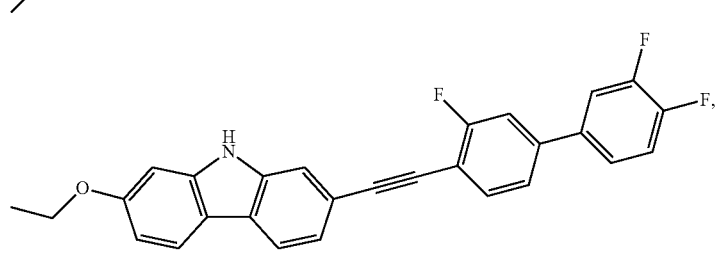
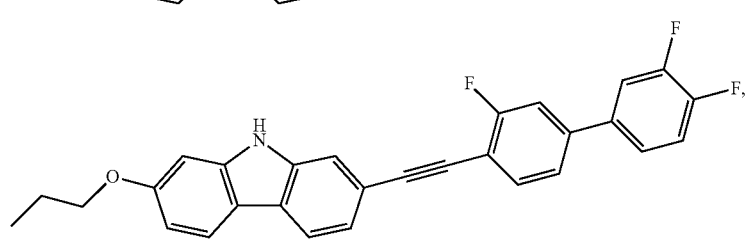
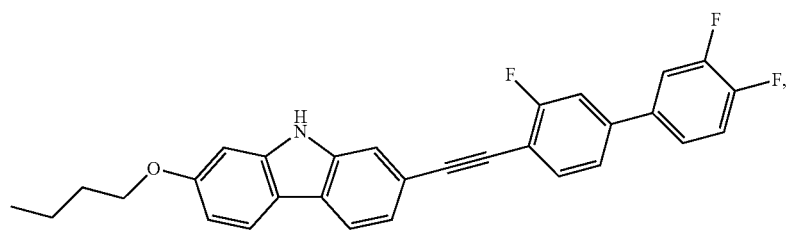

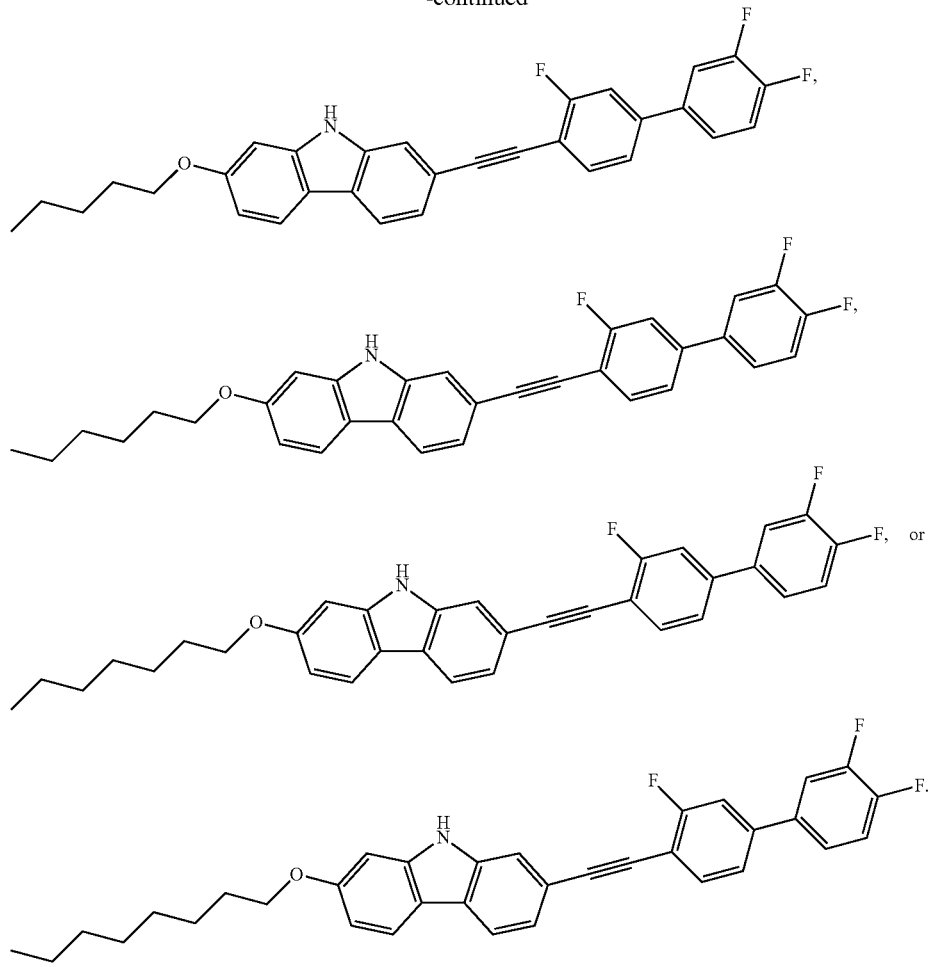

Embodiment 4. The composition of embodiment 1, 2, or 3, further comprising a second compound of Formula 2:

     (2)

wherein $X^1$ is substituted phenyl, substituted biphenyl, substituted methyl benzoate, or substituted phenyl acetate; and $Y^1$ is $C_{1-8}$ alkyl, $C_{1-8}$ alkyloxy, —CN, —NCS, F, Cl, OH, $NO_2$, —$NR^a R^b$, —$NHCOR^a$, —$NHSO_2 R^a$, —$OCOR^a$, or —$SO_2 R^a$, —$C(O)R^a$, —$C(O)OR^a$, —$C(O)NHR^a$, or —$C(O)NR^a R^b$, and $R^a$ and $R^b$ can be independently H or optionally substituted $C_{1-6}$ hydrocarbyl.

Embodiment 5. The composition of embodiment 4, where $X^1$ is:

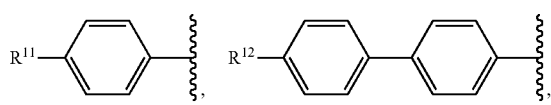

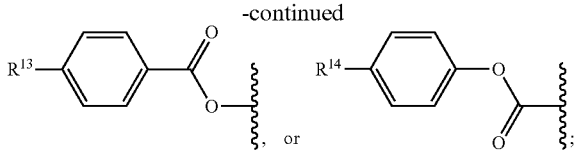

wherein $R^{11}$, $R^{12}$, $R^{13}$ and $R^{14}$ are independently alkyl or alkoxy.

Embodiment 6. The composition of embodiment 5, wherein $R^{11}$, $R^{12} R^{13}$ and $R^{14}$ are independently $C_{3-9}$ alkyl or $C_{3-9}$ alkoxy.

Embodiment 7. The composition of embodiment 4, 5, or 6, wherein $Y^1$ is $C_{1-8}$ alkyl, or —CN.

Embodiment 8. The composition of embodiment 4, 5, or 6, wherein the second compound is:

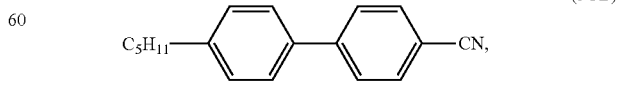  (5CB)

  (3OCB)

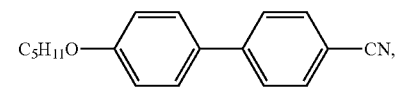 (5OCB)

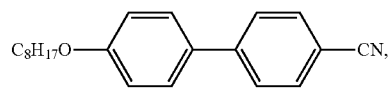 (8OCB)

 (5CT) or

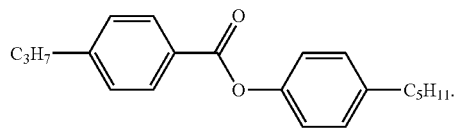 (5P3PrB)

Embodiment 9. A liquid crystal element, the element comprising: (1) a transparency changing layer, the layer comprising the composition of embodiment 1, where the layer defines two opposing surfaces and (2) at least two alignment layers, where the transparency changing layer is bounded on both opposing surfaces by the first and second alignment layers respectively.

Embodiment 10. A selectively dimmable device comprising: (1) at least two conductive substrates, the first and second conductive substrates defining a gap between them; (2) the element of embodiment 9 disposed between the first and second conductive substrates within the gap; and (3) a voltage source, where the substrates, the element, and the voltage source are all in electrical communication such that when a voltage is generated by the voltage source an electric field is applied across the element.

Embodiment 11. The device of embodiment 10, the device having a haze of at most 5% when there is no voltage applied but a haze of at least 40% when a voltage of 25 volts or more is applied across the device.

Embodiment 12. The device of embodiment 10, where the substrates are flexible so that the device forms a flexible sheet.

What is claimed is:

1. A liquid crystalline composition comprising a compound represented by the Formula 1:

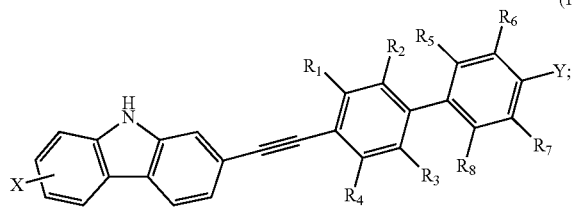 (1)

wherein $R_1$, $R_2$, $R_3$, $R_4$, $R_5$, $R_6$, $R_7$, and $R_8$ are independently: —H, a $C_{1-6}$ alkyl, a $C_{1-6}$ alkyloxy, —F, —$CF_3$, or —$OCF_3$; X is a $C_{2-12}$ alkyl or a $C_{2-12}$ alkyloxy, where any non-consecutive $CH_2$ can be optionally substituted with —O—, —B—, or —S—; and Y is a: —F, —CN, —$CF_3$, —$OCF_2$, —$OCF_3$, or —NCS.

2. The composition of claim 1, wherein X is selected from:

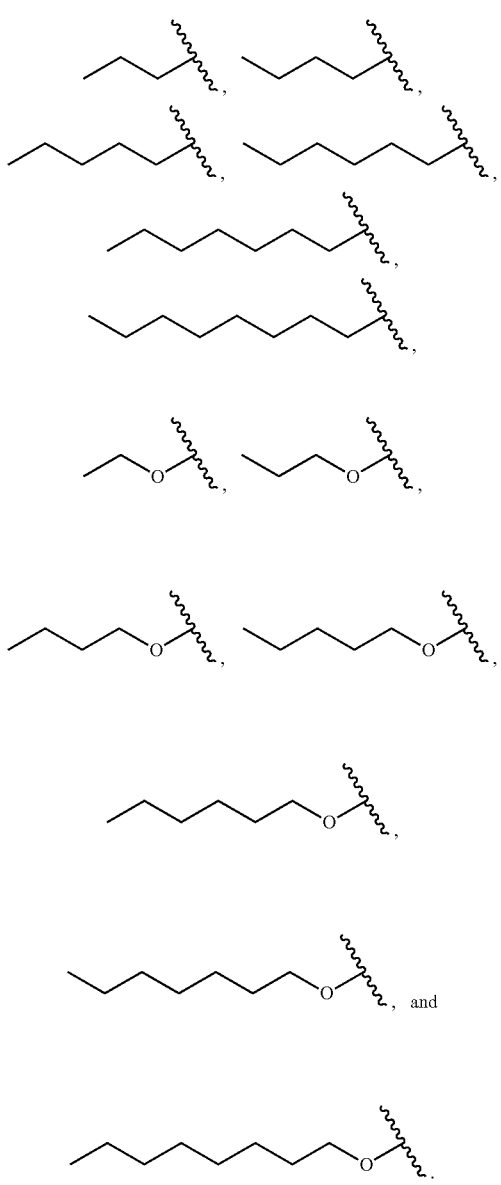

3. The composition of claim 1, wherein the composition comprises a compound represented by:
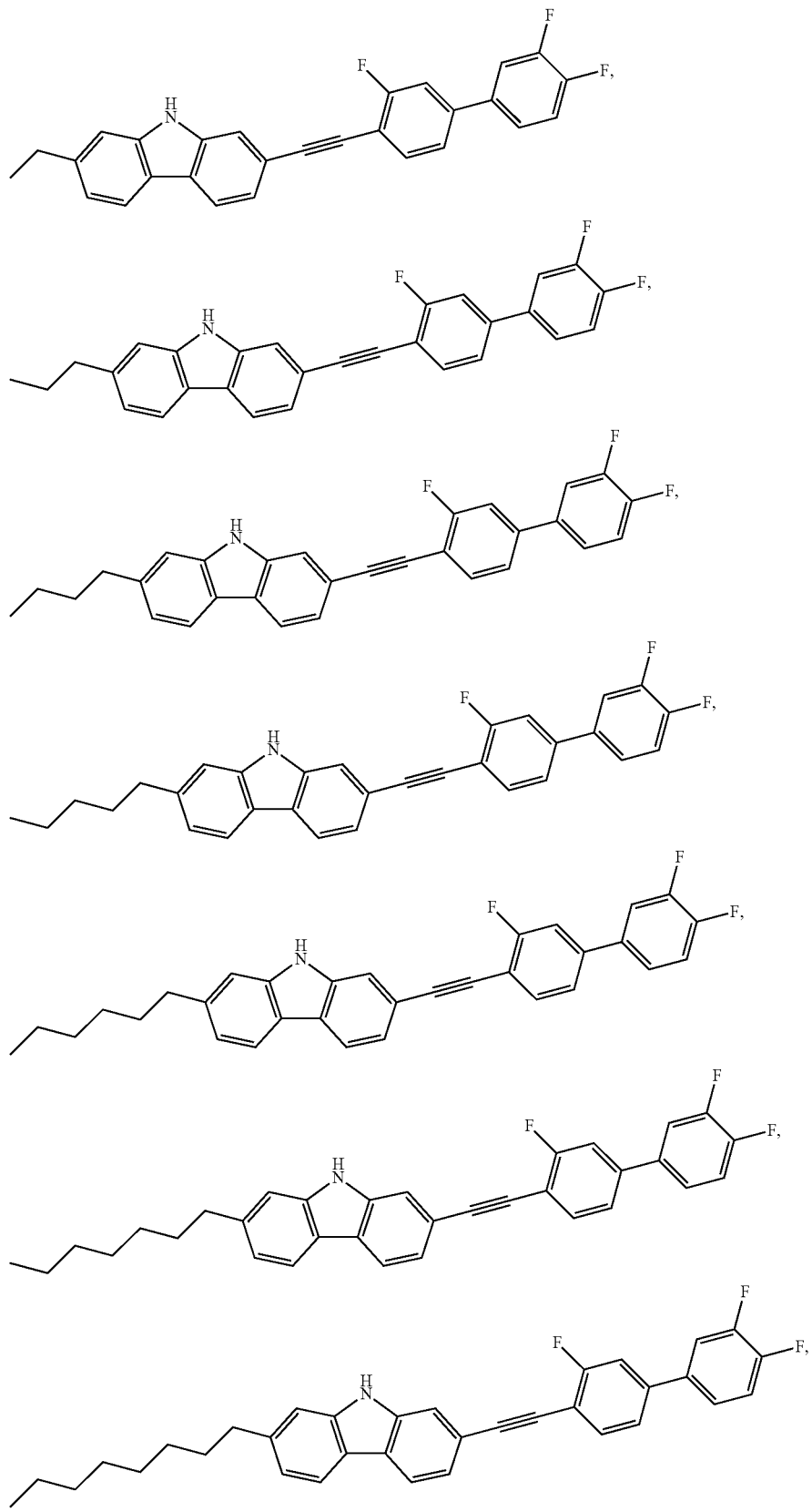

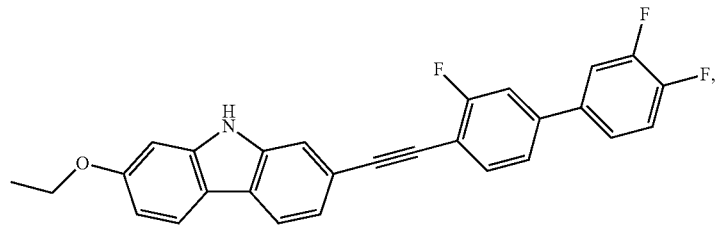
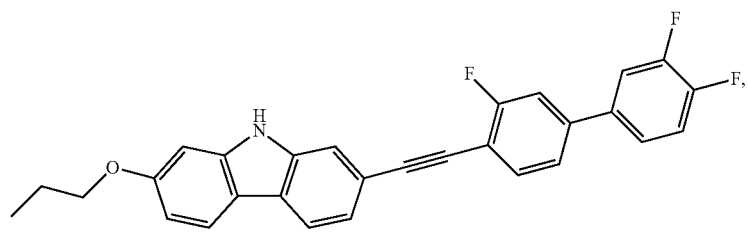
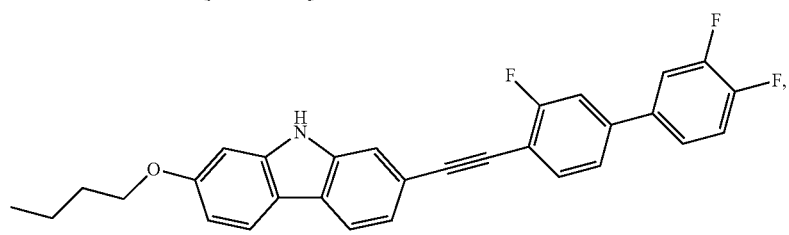
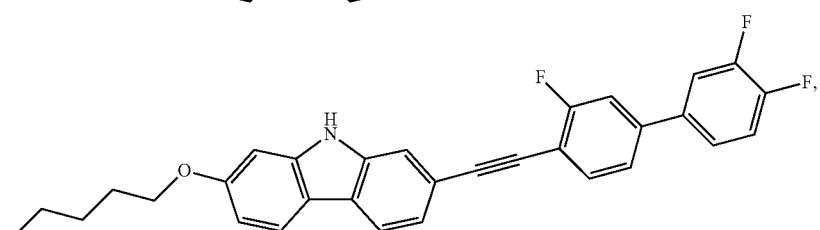
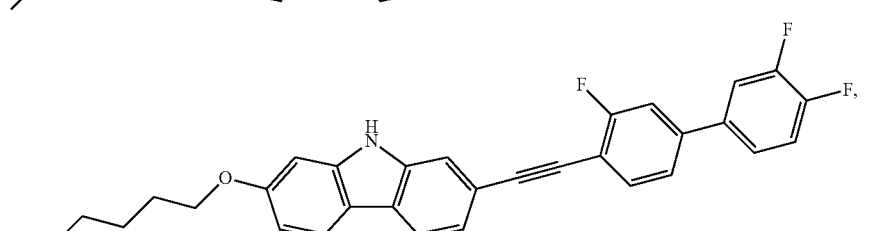
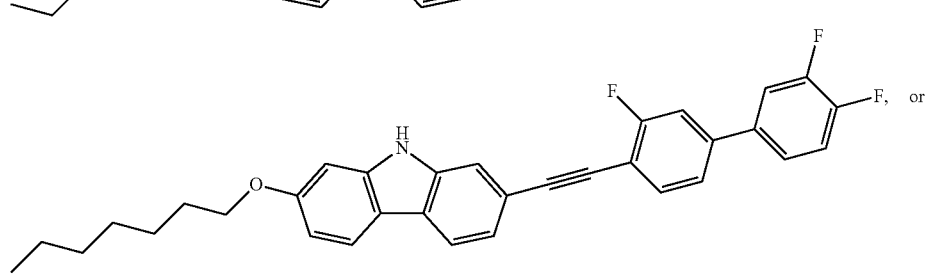, or
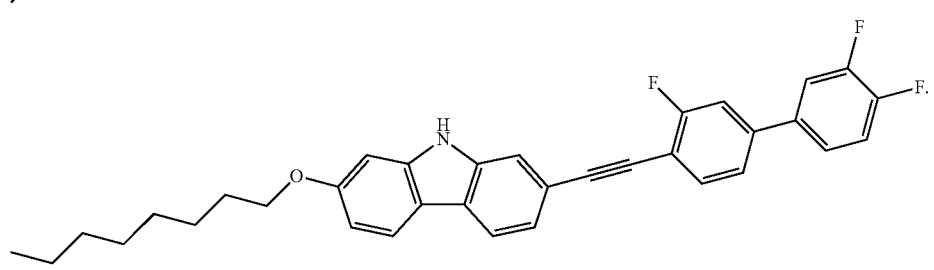

4. The composition of claim 1, further comprising a second compound of Formula 2:

(2)

wherein $X^1$ is substituted phenyl, substituted biphenyl, substituted benzoate, or substituted phenyl acetate; and $Y^1$ is $C_{1-8}$ alkyl, $C_{1-8}$ alkyloxy, —CN, —NCS, F, Cl, OH, $NO_2$, —$NR^aR^b$, —$NHCOR^a$, —$NHSO_2R^a$, —$OCOR^a$, or —$SO_2R^a$; —$C(O)R^a$, —$C(O)OR^a$, —$C(O)NHR^a$, or —$C(O)NR^aR^b$, and $R^a$ and $R^b$ can be independently H or optionally substituted $C_{1-6}$ hydrocarbyl.

5. The composition of claim 4, where $X^1$ is:

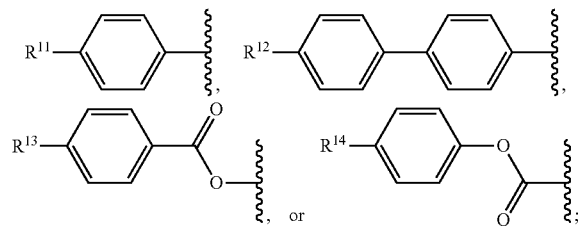

wherein $R^{11}$, $R^{12}$, $R^{13}$ and $R^{14}$ are independently alkyl or alkoxy.

6. The composition of claim 5, wherein $R^{11}$, $R^{12}$, $R^{13}$ and $R^{14}$ are independently $C_{3-9}$ alkyl or $C_{3-9}$ alkoxy.

7. The composition of claim 4, wherein $Y^1$ is $C_{1-8}$ alkyl, or —CN.

8. The composition of claim 4, wherein the second compound is:

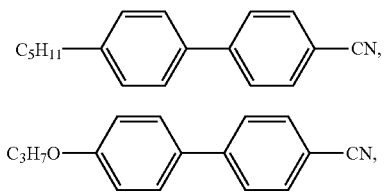

(5CB)

(3OCB)

-continued

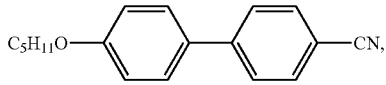

(5OCB)

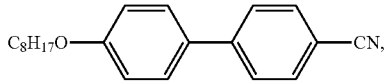

(8OCB)

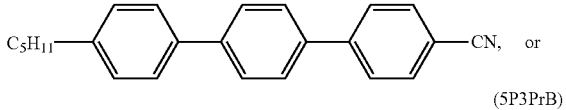

(5CT)

or

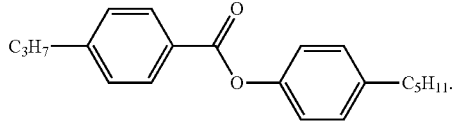

(5P3PrB)

9. A liquid crystal element, the element comprising: (1) a transparency changing layer, the layer comprising: the composition of claim 4, a polymer precursor, a chiral dopant, and a photoinitiator; wherein the layer defines two opposing surfaces; and (2) at least two alignment layers, wherein the transparency changing layer is bounded on both opposing surfaces by the first and second alignment layers respectively.

10. A selectively dimmable device comprising: (1) at least two conductive substrates, the first and second conductive substrates defining a gap there between; (2) the element of claim 9 disposed between the first and second conductive substrates within the gap; and (3) a voltage source, where the substrates, the element, and the voltage source are all in electrical communication such that when a voltage is generated by the voltage source an electric field is applied across the element.

11. The device of claim 10, the device having a haze of at most 5% when there is no voltage applied but a haze of at least 40% when a voltage of 25 volts or more is applied across the device.

12. The device of claim 10, where the substrates are flexible so that the device forms a flexible sheet.

13. The device of claim 10, further comprising a removable backing.

14. The device of claim 10, further comprising a sealant.

* * * * *